United States Patent [19]
Johnson et al.

[11] Patent Number: 5,682,133
[45] Date of Patent: Oct. 28, 1997

[54] PROGRAMMABLE VEHICLE MONITORING AND SECURITY SYSTEM HAVING MULTIPLE ACCESS VERIFICATION DEVICES

[75] Inventors: Sam Johnson, Sugarhill; Cecil Wayne Ashe, Eatontoh; Jesse Brent Yates, Atlanta, all of Ga.

[73] Assignee: Mobile Security Communications, Inc., Atlanta, Ga.

[21] Appl. No.: 473,109

[22] Filed: Jun. 7, 1995

Related U.S. Application Data

[63] Continuation of Ser. No. 153,140, Nov. 16, 1993.
[51] Int. Cl.$^6$ .................................................. B60R 25/10
[52] U.S. Cl. ................. 340/426; 340/425.5; 340/988; 340/825.31; 340/825.49; 340/825.34
[58] Field of Search ........................... 340/426, 539, 340/990, 995, 988, 825.31, 825.34, 425.5, 825.49; 342/357, 457, 388, 389, 450

[56] References Cited

U.S. PATENT DOCUMENTS

| | | | |
|---|---|---|---|
| 4,651,157 | 3/1987 | Gray et al. | 340/426 |
| 4,754,255 | 6/1988 | Sanders et al. | 340/539 |
| 4,933,664 | 6/1990 | Igawa et al. | 340/426 |
| 5,155,689 | 10/1992 | Wortham | 340/990 |
| 5,223,844 | 6/1993 | Mansell et al. | 342/357 |
| 5,259,025 | 11/1993 | Monroe et al. | 340/805.31 |
| 5,334,974 | 8/1994 | Simms et al. | 340/995 |

*Primary Examiner*—Jeffery Hofsass
*Assistant Examiner*—Benjamin C. Lee
*Attorney, Agent, or Firm*—Jones & Askew, LLP

[57] ABSTRACT

A security system having two-way communication with a central monitoring station. The security system is equipped with a computerized control and communications unit. The control and communications unit is connected to a position determination device and to a calling unit. The control and communications unit is also connected to several intrusion detection devices. Upon direction of the control and communications unit, for example, in response to the detection of a violation of an intrusion detection device, the calling unit establishes a communications link with the central monitoring station and communicates thereto the status and location of the vehicle in which the security system is located. The control and communication device is operable to receive commands from a handset electrically connected thereto. The central monitoring station, by communicating with the control and communications unit, is operable to control functional units of the vehicle. The central monitoring station includes a display on which maps showing the location of vehicles in communication with the monitoring station and information about such vehicles. An operator at the monitoring station may direct equipment in the monitoring station to initiate calls to law enforcement organizations and emergency response vehicles. Other systems and methods are disclosed.

2 Claims, 36 Drawing Sheets

Fig. 8D

Customer Information — 615

- Customer Name: John Q Customer
- Address: 654 Lake Line Road
- Clarksville Ga 45604
- Account Number: 0123456
- Home Phone: 505-765-0453
- Work Phone: 505-654-8000
- Car Phone: 505-345-5643
- Number Of Times Logged In: 4
- Date Of Last Log In: 12/25/92
- Operator Last Log In: Bulldog

PROGRAMMABLE VEHICLE MONITORING AND SECURITY SYSTEM HAVING MULTIPLE ACCESS VERIFICATION DEVICES

This is a continuation, of application Ser. No. 08/153,140, filed Nov. 16, 1993.

FIELD OF THE INVENTION

The present invention relates to vehicle location and alarm systems, and more particularly to a system for determining the location, speed and direction of a vehicle, if moving, and a means for monitoring a set of vehicle intrusion sensors to determine if a violation has occurred. The system utilizes bi-directional cellular telephone network communication to signal a remote central monitoring station which can issue signal commands to the vehicle capable of affecting various functions or mechanisms in order to immobilize the vehicle.

BACKGROUND OF THE ART

In 1991 approximately 1.8 million vehicles were stolen in the United States, about one vehicle every 20 seconds. Car theft costs at least $8.3 billion yearly and accounts for almost half of the total property lost to crime each year. Additionally, approximately $1.0 billion is spent annually in local law enforcement efforts to address car thefts and related crimes.

While improvements to vehicle security systems, such as car alarms and ignition and steering wheel locks, have made auto theft more difficult to amateur auto thieves, such devices are of little significance to the professional auto thief. The chance of apprehension, conviction, and imprisonment of an auto thief is less than one percent.

One drawback to the improvement of conventional alarm systems and other anti theft technology is that the mode of auto theft has changed. With increasing frequency auto thieves steal cars by commandeering the car from the owner at gun point—carjacking. While carjacking still accounts for a relatively small fraction of all car thefts, its violent nature, occasionally involving the murder of the owner of the vehicle, and its increasing frequency, as many as 60 carjackings per day, makes it a crime which is very worrisome to most motorists.

Conventional security devices such as alarm systems are plagued by numerous drawbacks. First, most professional car thieves are not deterred by or are able to circumvent the alarm system. Second, conventional alarm systems are usually ignored by the public at large. Most casual passersby ignore the sound of a car alarm as being the shriek of the proverbial boy who cries wolf. Third, car alarms provide no means for tracking a stolen vehicle, and, thus, do not aid in the recovery of the vehicle. Fourth, car alarms do not aid the victim of a carjacking. Most carjackers will not approach a vehicle until the owner of the car has disarmed the alarm system, and a person with a weapon held to his/her head is very unlikely to turn on an alarm for the fear of aggravating the robber to the point of taking some violent action.

To address certain of these deficiencies in car alarm systems, in particular the lack of tracking ability, systems have been developed which enable law enforcement personnel to locate stolen vehicles.

U.S. Pat. No. 5,223,844 to Mansell et al. teaches a vehicle tracking system in which the global positioning system (GPS) is used to determine the location of vehicles. The vehicles are further equipped with cellular telephone equipment for continuously tracking the vehicles in a fleet. Mansell provides for a separate keypad for entering commands to be sent to a control center.

These system suffer from the deficiencies that a separate keypad is necessary for communication with the security system. Further deficiencies include the lack of programmability and the inability to provide for a separate voice mode in which the identity of an occupant of the vehicle can be verified through spoken words. Prior art systems further do not provide for visual identification of the occupant of a vehicle.

It is therefore desirable to provide a system which provides for a security system which prevents theft and carjacking of vehicles, assists in the recovery of stolen vehicles, and which overcomes the deficiencies in the prior art.

SUMMARY OF THE INVENTION

The present invention provides a security system for protecting a vehicle from theft and from carjacking.

Generally described, the present invention provides a security system installed in a vehicle which is in telecommunication with a central monitoring station to communicate alarm conditions to the central monitoring station, and to receive directives from the central monitoring station.

In a preferred embodiment, the present invention provides a system in which a vehicle is equipped with a plurality of intrusion detection devices which are operable to detect violation of a protection zone, and operable to output signals to indicate a violation of the protection zone. A calling device, such as a cellular telephone, operable to establish a communication link to said central monitoring station is connected to the intrusion detection devices via a computerized control and communications unit. The computerized control and communications unit, responsive to signals from the intrusion detection devices, causes the calling unit to establish a communication link to the central monitoring station. The vehicle is further equipped with a position determination device, e.g. a GPS receiver, connected to the control and communications unit and operable to determine position information of the vehicle.

The vehicle is further equipped with devices to determine the identity of occupants of the vehicle. In one embodiment the identification is obtained via a keypad on a cellular telephone handset, in another embodiment the identification is obtained using voice recognition, and in a third embodiment a video image is obtained of the driver of the vehicle and this video image is compared to archived images of authorized users of the vehicle. The vehicle is further equipped to receive and to process control signals from the central monitoring station. These signals may, for example, shut down the ignition of the vehicle or cause the head lights of the vehicle to flash.

It is an object of the invention to provide a security system for vehicles in which a communications link is established between one or more vehicles and a central monitoring station.

It is a further object of the invention to provide a security system in which a positioning device is used to determine the location of the vehicle.

It is an additional object of the invention to provide a security system in which intrusions trigger alarm situations which are communicated along with the location of the vehicle to a central monitoring station.

It is further an object of the invention to provide an automotive security system with a pager so that a central monitoring station can request the security system to call the central monitoring station and report the location of the vehicle.

It is an additional object of the invention to provide an automotive security system having a cellular telephone handset which may be used both for verbal communication to other telephones and for entering keyed and verbal commands to the security system.

It is a further object of the invention to provide an automotive security system in which features, such as the arming and disarming of particular intrusion detection zones, the automatic arming of the system, the range in which the vehicle may travel, may be programmed through the handset of a calling device connected to the security system.

It is a further object of the invention to provide a security system in which a central monitoring station may take control of certain vehicle functions.

Other objects, features, and advantages of the present invention will become apparent upon reading the following detailed description of embodiments of the invention, when taken in conjunction with the accompanying drawing and the appended claims.

BRIEF DESCRIPTION OF THE DRAWINGS

The invention is illustrated in the drawings in which like reference characters designate the same or similar parts throughout the figures of which:

FIGS. 8(a) through 8(i) illustrate the user interface of the central monitoring station of FIG. 6.

DESCRIPTION OF THE PREFERRED EMBODIMENTS

Figure 1:
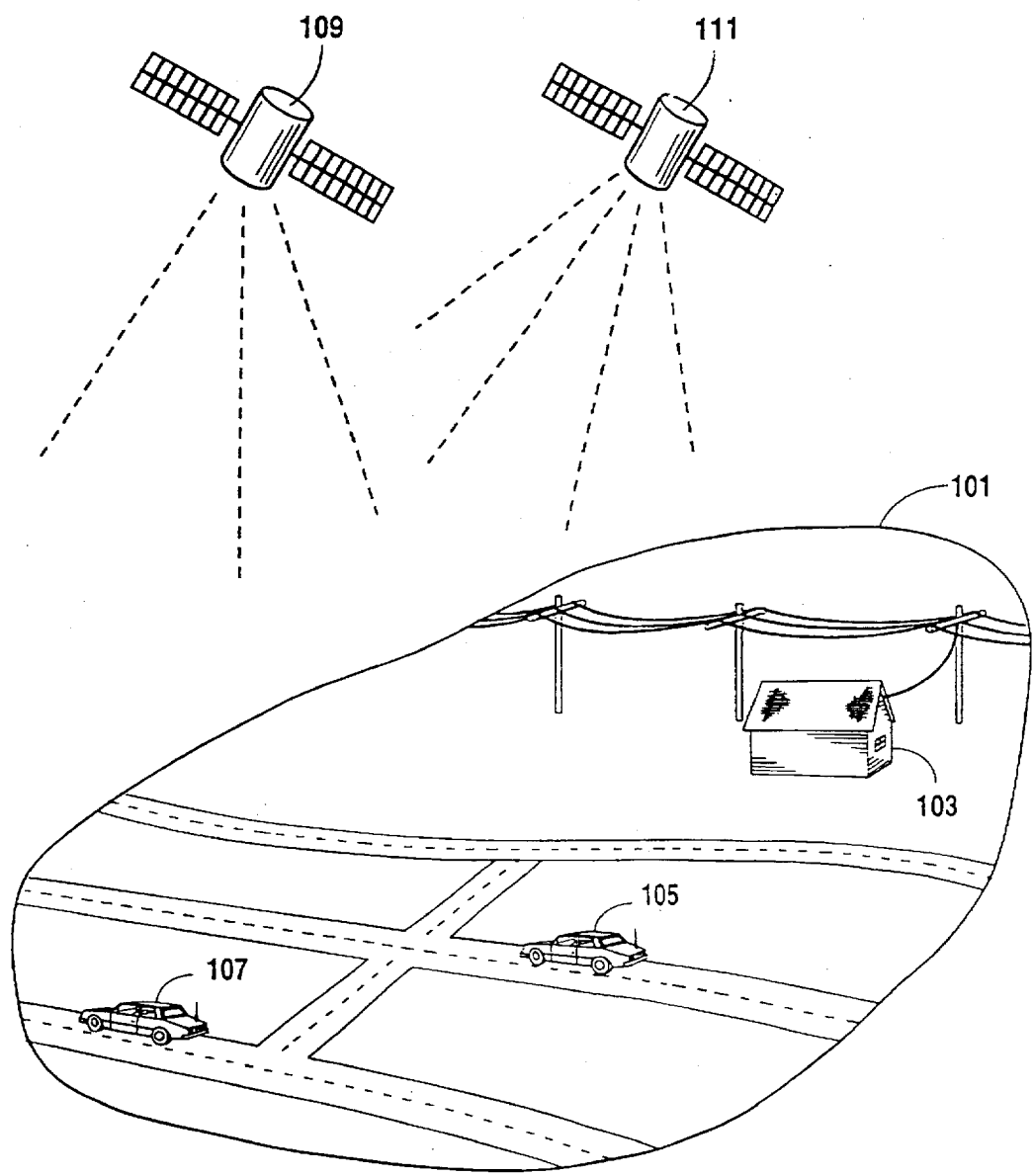
FIG. 1 is a perspective view of a landscape in which a central monitoring station according to the present invention is located and in which several vehicles equipped with the security system according to the present invention are traveling.

FIG. 1 is a perspective view of a landscape in which a central monitoring station according to the present invention is located and in which several vehicles equipped with the security system according to the present invention are traveling. FIG. 1 shows a geographical area 101. A central monitoring station 103 is located in the geographical area 101. Two vehicles 105 and 107 are also located in and are traveling in the geographical area 101. There is no limit on the number of vehicles which may be protected by the a security system constructed as described herein. Similarly, multiple central monitoring stations, for example, each serving a different geographic area, is also within the scope of the present invention.

Orbiting the earth somewhere above the geographical area 101 are a multitude of global positioning satellites, two of which are shown in FIG. 1 as satellites 109 and 111. The Global Positioning System (GPS) is a U.S. Department of Defense developed system consisting of a constellation of 24 satellites. Each satellite constantly broadcasts precise timing and location signals. A GPS receiver is able to determine the distance between itself and a transmitting satellite by knowing the location of the satellite and determining the elapsed time between the transmission and the receipt of the signal. By receiving signals from several satellites simultaneously, a receiver can pin-point its location with an accuracy of 20 to 100 meters.

Each vehicle, e.g., vehicle 107 or vehicle 109, that utilizes the security system according to the preferred embodiment, has a GPS receiver and other circuitry (discussed below in conjunction with FIGS. 2–9) to receive GPS transmissions from several satellites simultaneously. By analyzing the signals from several satellites, the on-vehicle circuitry is able to calculate the location of the vehicle 107 and 109.

Each vehicle 107 and 109 is further equipped with cellular telephone transceivers (discussed below in conjunction with FIGS. 2 through 5, 10, and 11). The cellular telephone transceivers transmit location data, using the cellular telephone system, to the central monitoring station 103 (discussed in detail below in conjunction with FIGS. 6 through 9).

Figure 2:
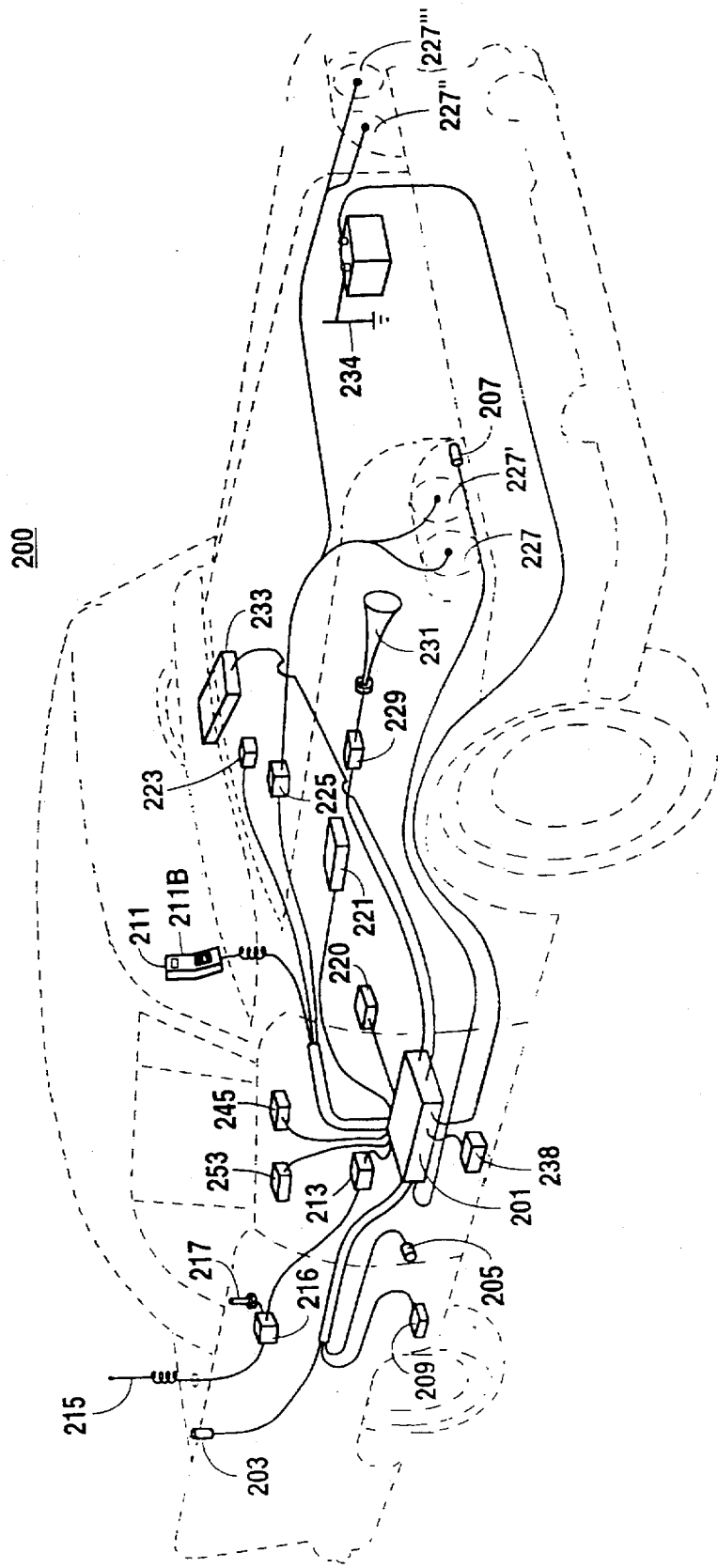
FIG. 2 is perspective view of a vehicle having a security system according to the present invention.

FIG. 2 is a perspective view of a vehicle having a security system according to the present invention. A vehicle 200, for example an automobile, is equipped with a security system. The security system includes a control and communications unit 201 connected to a number of intrusion detection devices, for example, a pin switch 203 located to detect when the trunk is opened, a pin switch 205 located to detect when a door is opened, a pin switch 207 located to detect when the hood is opened, a motion detection device 209 which is operable to detect any motion of the vehicle 200.

The control and communications unit 201 upon receiving a signal from any of the intrusion detection devices may act as a car alarm system and sound a siren, e.g., a horn 231.

The vehicle 200 is further equipped with a GPS receiver unit (internal to the control and communications unit 201) which is connected to a GPS antenna 220. The GPS receiver unit is a multichannel GPS receiver and can thus receive time and location signals from multiple GPS satellites simultaneously.

The vehicle 200 is further equipped to transmit and receive voice and data over a cellular telephone system. In an alternative embodiment the vehicle 200 is additionally equipped to transmit images over a cellular telephone system. Generally, vehicle 200 is equipped with circuitry operable to transmit the location of the vehicle as well as security codes, panic codes and voice to the central monitoring station 103.

To be able to receive and transmit voice and data over the cellular telephone network, the vehicle 200 is equipped with a cellular transceiver 213 that is connected to the control and communications unit 201. The control and communications unit 201 is further attached to a cellular telephone handset 211. The cellular telephone handset 211 includes a keypad 211b with which the operator of the vehicle 200 can enter commands and codes to the control and communications unit 201.

The cellular telephone transceiver 213 is connected to a cellular telephone antenna 215 via an antenna selection relay 216. During the theft of a vehicle, it is not uncommon that the thief attempts to remove the cellular telephone equipment, including any antennas. Therefore, a backup cellular antenna 217 is also attached to the antenna selection relay 216. If the cellular telephone antenna 215 is removed from the vehicle 200, the antenna selection relay is operable to make a connection between the backup cellular antenna 217 and the control and communications unit 201.

The control and communications unit 201 and the backup cellular antenna 217 are preferably located somewhere in the vehicle 200 where they are inaccessible to a thief, for example, underneath a floor board or in the trunk of the vehicle 200.

The cellular telephone transceiver 213 is capable of receiving commands transmitted from the central monitoring station 103. In the event that the driver of the vehicle 200 fails to disarm the system or if the driver enters a panic code, the operator at the central monitoring station 103 may control certain aspects of the operation of the vehicle 200. The operator of the central monitoring station 103 takes control of the vehicle by transmitting control codes via the cellular telephone system to the vehicle 200. These control codes are received by the cellular telephone transceiver unit 213 and processed by the control and communications unit 201. The control and communications unit 201 is programmed (as described in conjunction with FIGS. 10(a) through 10(o)) to accept these commands from the transceiver 213, parse the commands, and upon recognition of certain commands, control certain operational functions of the vehicle 200. Examples of such control functions are: locking and unlocking the power locks, turning off the ignition, opening and closing the power windows, sounding the horn, flashing the head lights, flashing the interior lights, turning off the fuel line.

To control these functions, the control and communications unit 201 is connected to certain relays. For example, the control and communications unit 201 is connected to the light relay 225. The light relay 225 is connected to the head lights 227, 227', 227", and 227'". By turning off the current to the relay 225 the control and communications unit can flash (or otherwise control) the headlights 227' through 227'". Similarly, the control and communications unit 201 is connected to a horn relay 229. The horn relay 229 controls the horn 231. The horn 231 may be either the horn normally installed in the vehicle 200 or may be an auxiliary horn used primarily for alarm purposes.

The control and communications unit 201 is also attached to an ignition module 221. The ignition module 221 is, for example, an electronic ignition module. The control and communications unit 201, by turning on or off a current to the ignition module 221 controls the operation of the engine of the vehicle 200.

As an alternative means for disabling the vehicle 200, the control and communications unit 201 is connected to a fuel line control valve 223. The fuel line control valve 223 is connected on the fuel line (not shown) between the fuel tank (not shown) and the engine (not shown). The fuel line control valve 223 is an electrically controllable valve. By turning on or off the current to the valve 223, it is either shut or opened, thereby controlling the fuel supply to the engine.

The vehicle 200 is further equipped to identify any of its occupants. In a first embodiment, the keypad 211b is used by the occupant to enter commands and codes. For example, if the security system is armed and the door pin switch 205 detects that a door has been opened, the control and communications unit changes modes into an AUDIT mode (the different modes of operation of the security system according to the preferred embodiment are discussed further below). During AUDIT mode the operator of the vehicle is allowed a predetermined amount of time (e.g., 30 seconds) during which to disarm the system. Disarming is accomplished by entering a code on the keypad 211b.

In an alternative embodiment, disarming codes are entered by speaking verbal codes to the cellular telephone handset 211. These verbal codes are transmitted from the handset 211 to a voice recognition circuit (discussed further in conjunction with FIG. 4). The voice recognition circuit is operable to distinguish the voice of authorized operators of the vehicle 200.

In a third alternative embodiment, the vehicle 200 is equipped with a camera 233. The camera 233 is for example a charge-coupled device (3D) camera. The camera 233 is positioned such that it obtains an image of the driver of the vehicle 200. The camera 233 is connected to the control and communications unit 201 so that an image from the camera 233 may be processed by the control and communications unit 201 and transmitted via the cellular telephone system to the central monitoring station 103. At the central monitoring station a determination is made as to whether the driver of the vehicle 200 is an authorized driver. For example, the image is displayed on a graphics display 605 at the central monitoring station 103 (the equipment of the central monitoring station is discussed in conjunction with FIG. 6) and an operator views the image and compares it to images in a database 607. Alternatively, pattern recognition algorithms are used to verify that the driver of the vehicle 200 is an authorized driver.

The vehicle 200 is further equipped with a pager receiver 245 connected to the control and communications unit 201. The pager receiver 245 is operable to receive a page from the central monitoring station 103. The pager receiver 245 of each vehicle 200 is operable to be paged on the same telephone number. In a data stream following the page, an identifying code is transmitted. The identifying code is uniquely associated with each vehicle 200. Thus, while all vehicles 200, which are within reach of the page, receive the page, the unique identifying code allows each vehicle 200 to discern whether the page is intended for itself or for another vehicle and to only respond to commands address to itself.

On the data stream following the identifying code, a command is transmitted through the pager receiver 245 to the control and communications unit 201. Commands include "call central monitoring station", "arm security system", "disarm security system", "lock doors", "unlock doors".

The vehicle 200 may also be equipped with an RF receiver 253 connected to the control and communications unit 201. The RF receiver 253 is operable to receive a signal transmitted from a hand held palm-sized transmitter for example attached to a person's key chain. The transmitted signal causes the control and communications unit 201 to either arm or disarm the alarm system and to lock or unlock the vehicle's 200 doors.

The control and communications unit 201 is further connected to a buzzer 255. The buzzer 255 is sounded to indicate an AUDIT state or an ALARMING state.

The control and communications unit 201 and its associated peripheral devices, e.g., transceiver unit 213, are powered by the vehicle's battery 234. To provide backup power, for example in the event a thief removes the vehicle's battery 234, a backup battery 238 is also connected to the control and communications unit 201. The voltage levels of both the vehicle battery 234 and the backup battery 238 are monitored by the control and communications unit 201. A low voltage on either battery causes an appropriate warning message to be displayed on the handset display 211a.

Figure 3:
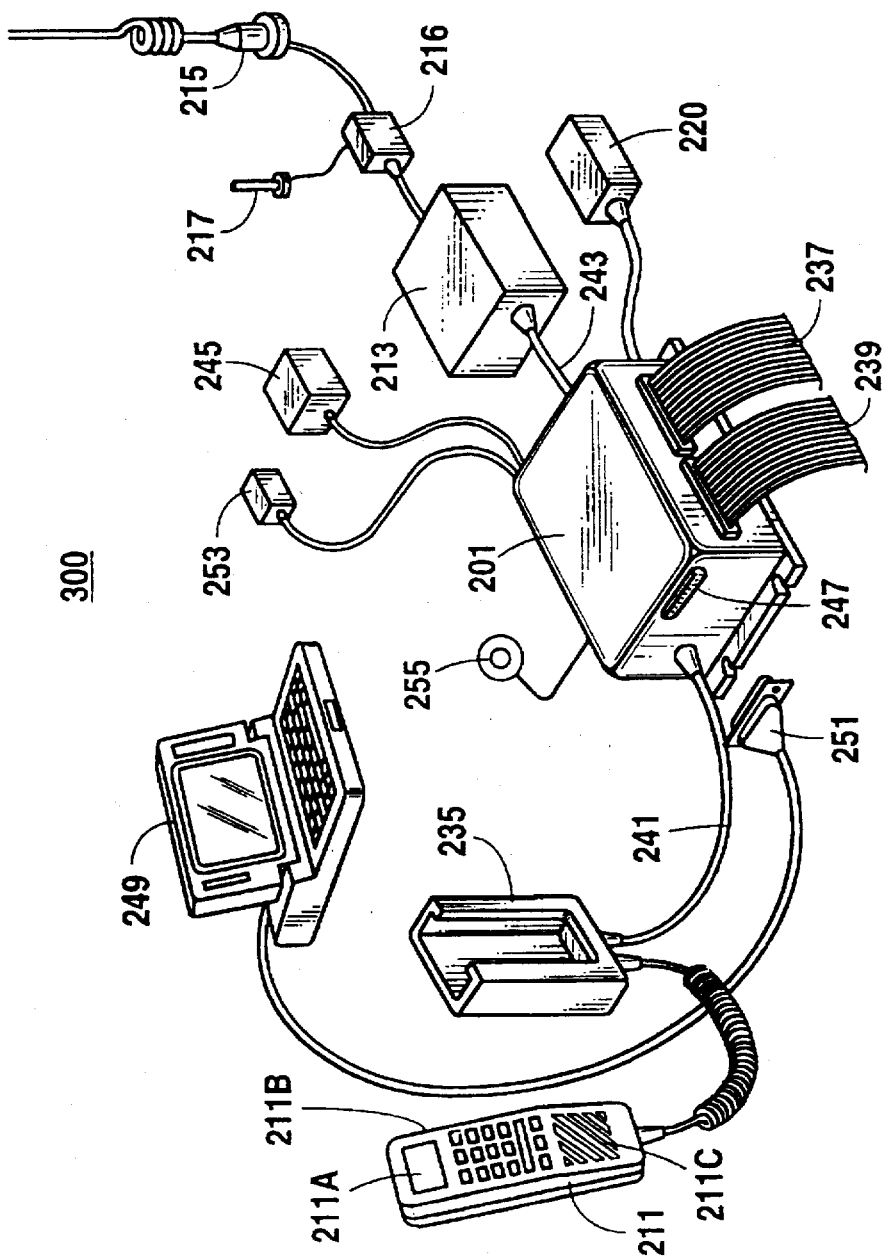
FIG. 3 is a perspective view of the security system according to the present invention.

FIG. 3 is a perspective view of the security system according to the present invention. A security system 300 consists of the control and communications unit 201 that is connected to the cellular telephone transceiver 213, the cellular telephone antenna 215, the cellular telephone backup antenna 217, and the GPS antenna 220. Furthermore, the control and communications unit 201 is connected to the cellular telephone handset 211 either directly or via a cradle 235 (as shown in FIG. 2). An RJ45 cable 241 forms the connection between the control and communications unit 201 and the cellular telephone handset 211.

The control and communications unit 201 receives input signals from various intrusion detection devices (as shown in FIG. 2). These signals are transmitted to the control and communications unit 201 on an input bus 237 that is connected to the control and communications unit 201. The control and communications unit 201 outputs signals to several control devices (as shown in FIG. 2). The output signals are placed by the control and communications unit 201 onto an output bus 239 that is connected to the control and communications unit 201.

The cellular telephone transceiver unit 213 is connected to the control and communications unit 201 via a RJ45 conductor 243.

The control and communications unit 201 has a connector 247 for connecting a portable computer 249 to the control and communications unit 201. The connector 247 is for example a RS232 connector. The portable computer 249 is equipped with a connector 251 with which the portable computer 249 is attached to the control and communications unit 201.

Figure 4A:
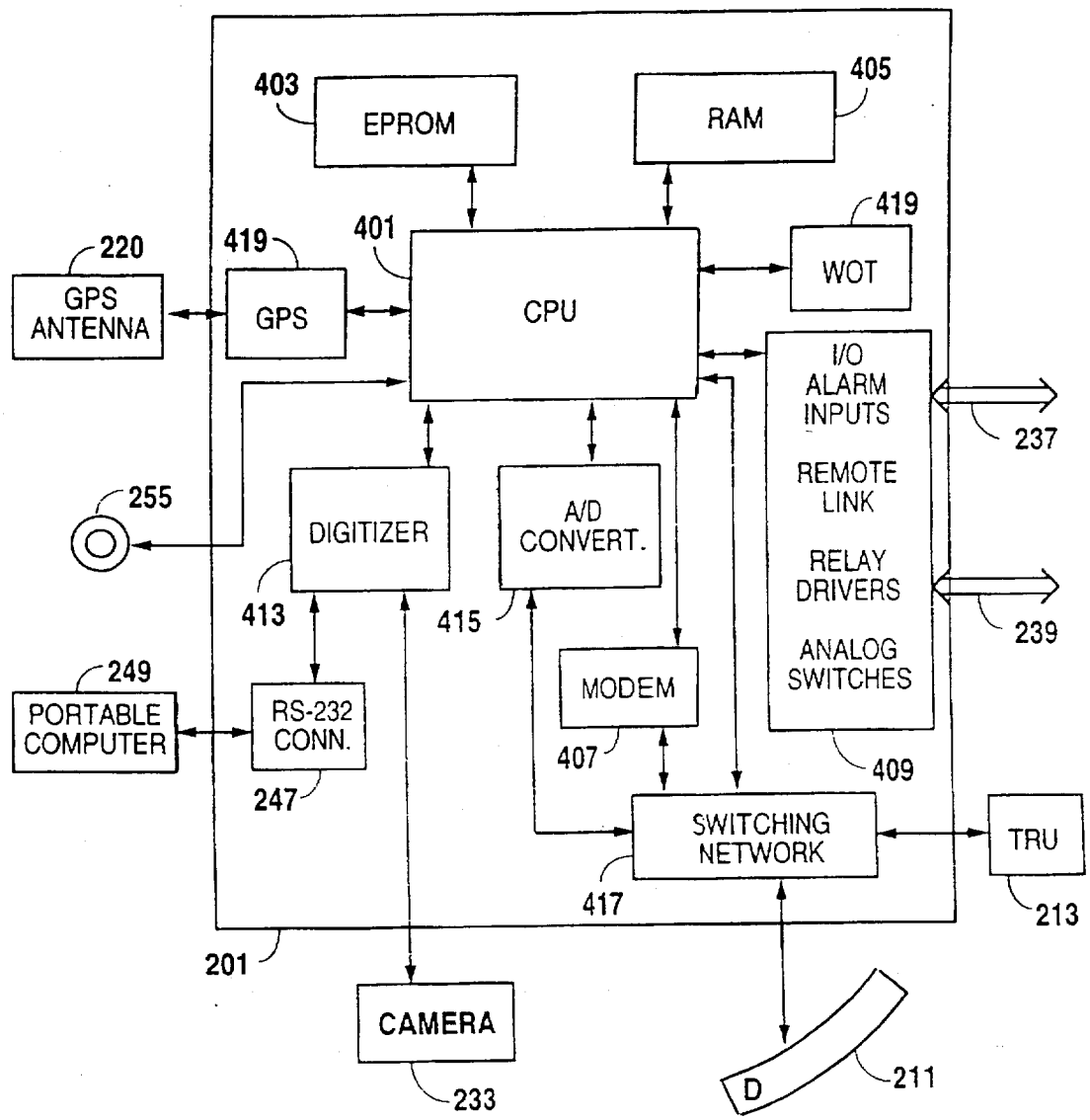
FIGS. 4(a) and 4(b) are block diagrams of the internal components of the control and communications unit of the present invention.

FIG. 4(a) is a block diagram of the internal components of the control and communications unit 201 of the present invention. The control and communications unit 201 consists of a Central Processing Unit (CPU) 401. The CPU 401 is, for example, a Hitachi HD7180 CPU. The CPU 401 is connected to an erasable programmable read only memory (EPROM) 403 and a random access memory (RAM) 405. The CPU 401 is further connected to a modem 407. The modem 407 is connected via a switching network 417 to the cellular telephone transceiver unit 213 for sending and receiving data to the central monitoring station 103. The handset 211 is also connected to the switching network 417 and to the CPU 401. The CPU 401 controls the switching network 417 so as to enable and disable communication between the handset 211 and transceiver unit 213. Communication between the handset 211 and the transceiver unit 213 is referred to herein as "normal communication mode". During normal communication mode the CPU 401 monitors the communication between the handset 211 and the transceiver unit 213 to determine whether the user of the handset 211 has entered a command for the control and communications unit 201 or whether the central monitoring station has sent a command to the vehicle 200. Commands for the control and communications unit 201 are entered on the keypad 211b of the handset 211. Any commands sent to the control and communications unit 201 are acknowledged by the control and communications unit 201 by sending display codes to the display 211a of the handset 211.

The switching network 417, upon control from the CPU 401, is further operable to disable communication between the handset 211 and the transceiver unit 213 and enable communication between the CPU 211 and the transceiver unit 213 via modem 407. This mode of operation is referred to herein as "alarm communication mode". During alarm communication mode all communication to and from the handset 211 is completely disabled.

The switching network 417, upon control from the CPU 401, is further operable to disable all communication to the transceiver unit 213 and enable communication between the handset 211 and the CPU 401. This mode of operation is referred to as "programming communication mode". Programming communication mode is used during system installation to enter user programmable features into the EPROM 403, or after installation to alter user programmable features. Programmable features of the security system 300 are discussed below.

The CPU 401 is further connected to a series of input-output drivers which are collectively labeled as element 409. The input-output drivers 409 are connected to the input bus 237 to receive signals from the various intrusion detection devices, e.g., the pin switches 203, 205, and 207, and the motion detector 209. The input-output drivers 409 are further connected to the output bus 239 for transmitting control signals to various control units, e.g., the relays 225 and 229, and ignition module 221. Control of the various relays are by means of one or more relay drivers (not shown). Automotive relays are typically controlled by a voltage of 12 volts. However, computer applications, such as the control and communications unit 201, typically use a voltage of 5.5 volts to signify a logic high. A logic high at 5.5 volts may be used to control a relay sensitive to 12 volts by providing the 5.5 volt signal to a relay driver which in turn produces the required 12 volt signal.

The CPU 401 is further connected to the GPS receiver 219. The CPU 401 polls the GPS receiver 219 to receive position data. The GPS receiver 219 is connected to the GPS antenna 220.

The portable computer 249 is optionally connected to a serial connector 247.

The camera 233 is connected to a digitizer 413 which is connected to the CPU 401. The digitizer 413 obtains video signals from the camera 233 and converts these signals from analog form to a digital representation, which may be processed by the CPU 401. The digitized signals are transmitted to the CPU 401 from the digitizer 413. The digitized signals from the digitizer 413 may be compressed by the CPU 401. The digitized signals are transmitted from the CPU 401 to the central monitoring station 103 via the modem 407 and the cellular transceiver unit 213.

The microphone 211c of the cellular telephone handset 211 is connected to an analog-to-digital (AD) converter 415 via the switching network 417. The AD converter 415 converts voice input spoken into the microphone 211c from analog form into a digital representation which can be processed by the CPU 401. The digitized representation of the voice is transmitted to the CPU 401 from the AD converter 415.

Figure 4B:
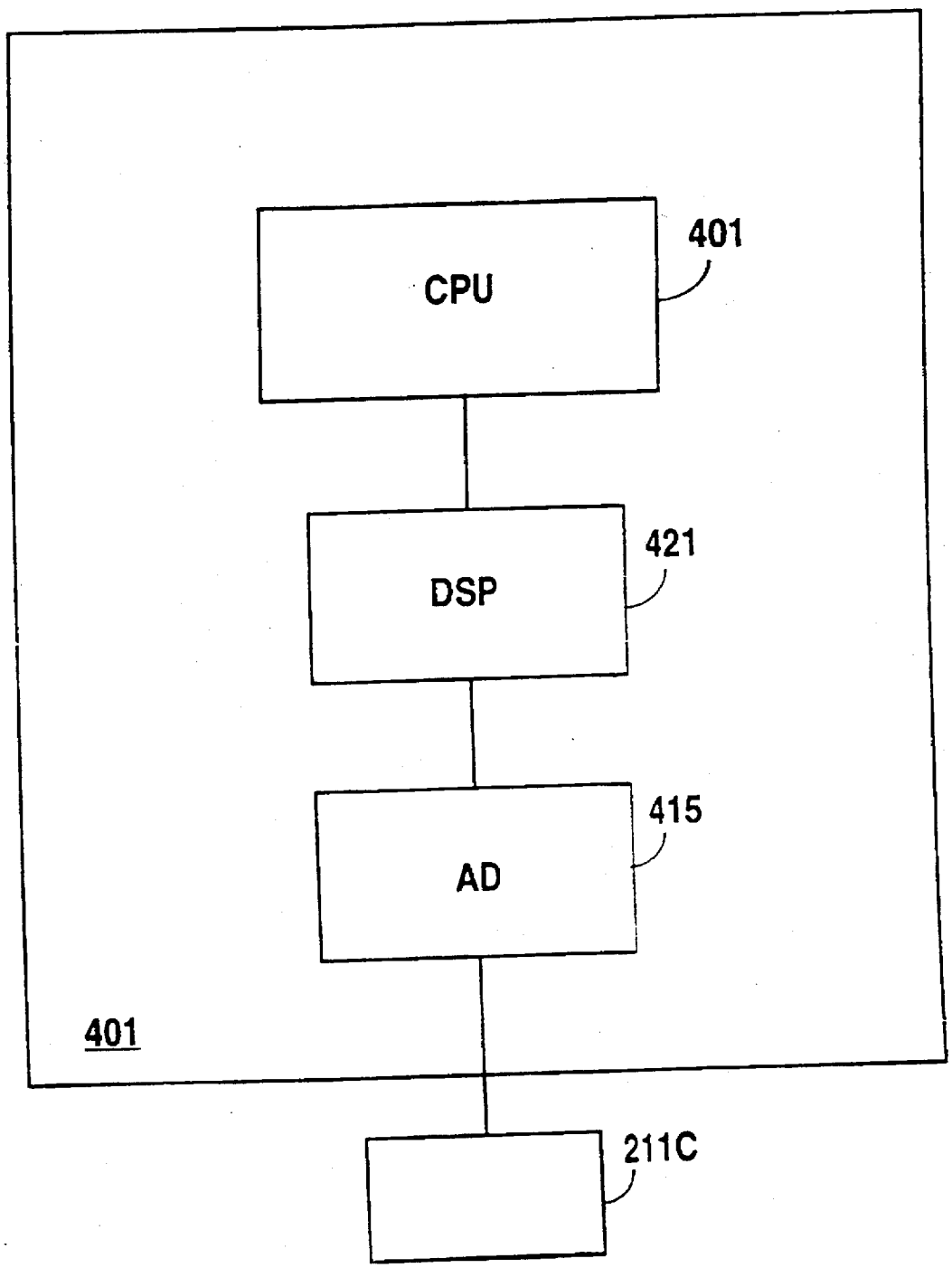

FIG. 4(b) illustrates an alternative embodiment for the connection of microphone 211 to CPU 401. In the alternative embodiment of FIG. 4(b), a digital signal processor (DSP) 421 is connected between the CPU 401 and the analog-to-digital converter 415. The DSP 421 is used to execute voice recognition algorithms to compare a spoken password to a stored password. For purposes of clarity, additional elements from FIG. 4(a) are not repeated in FIG. 4(b).

Returning to FIG. 4(a), the CPU 401 is protected from being caught in an infinite loop by being connected to a watchdog timer (WDT) 419. The watchdog timer 419 is connected to the reset pin of the CPU 401. Unless the watchdog timer 419 is toggled within a specified time period, the watchdog timer 419 sends a reset signal to the reset pin of the CPU and thereby causes the CPU 401 to reset.

The CPU 401 is also connected to the buzzer 255. By toggling a value on a control line between the CPU 401 and the buzzer 255, the buzzer is either sounded or silent.

Figure 5:
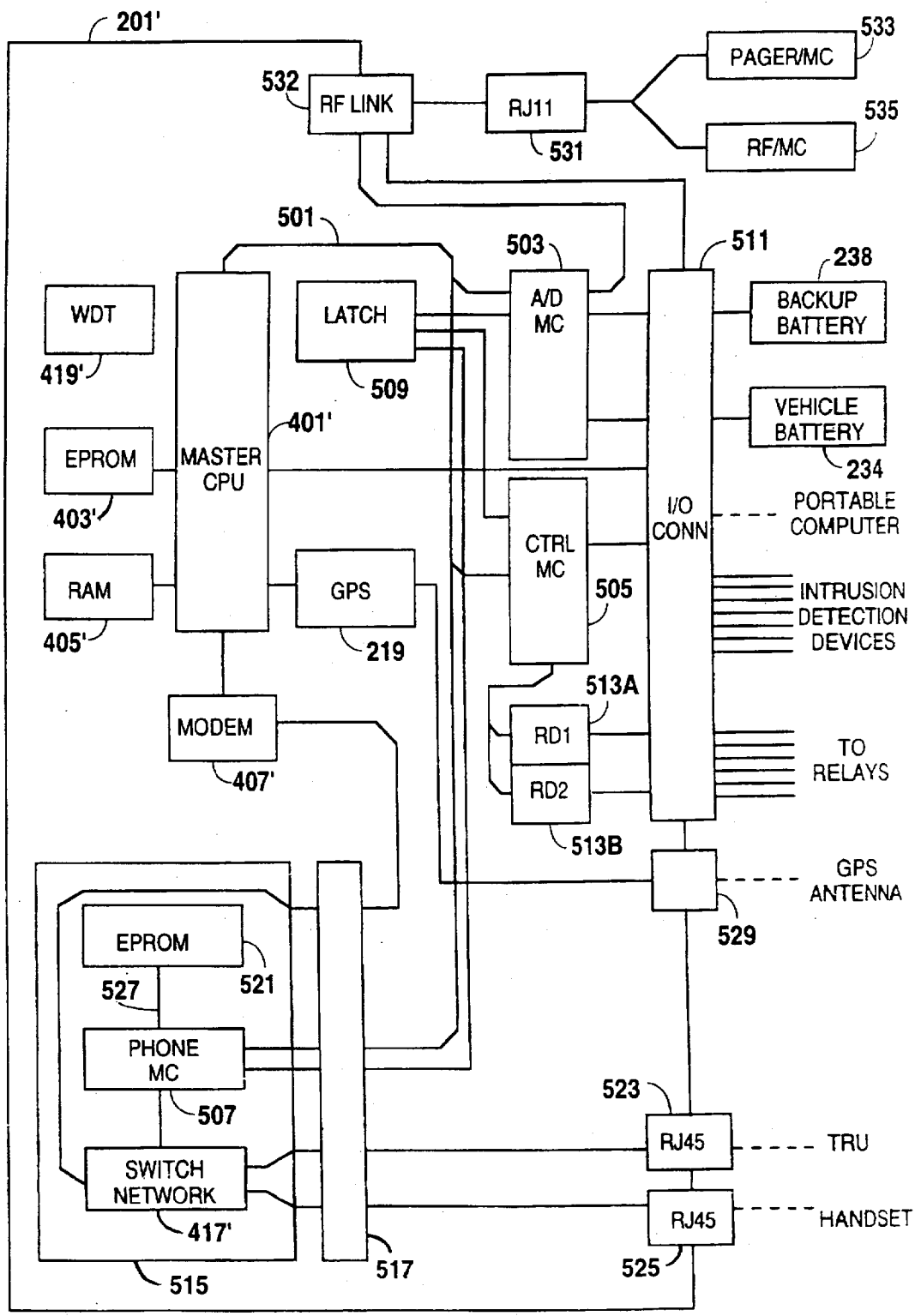
FIG. 5 is a block diagram of an alternative embodiment of the internal components of the control and communications unit of the present invention.

FIG. 5 is a block diagram of an alternative embodiment of a control and communications unit 201' according to the present invention. The control and communications unit 201' contains a CPU 401' which is connected to a EPROM 403' and a RAM 405'. The functions of the EPROM 403' and the RAM 405' are similar to the functions of the EPROM 403 and the RAM 405 shown in FIG. 4.

The CPU 401' is connected to a micro controller communications bus 501. The micro controller communications bus 501 provides for data communication between the CPU 401' and several micro controllers 503, 505, and 507. Each micro controller 503, 505, 507 is responsible for the input or control of external devices. To receive input for or to control an external device, the CPU 401' places an instruction and an address onto the micro controller communications bus 501. The address is latched into a latch 509 that is also connected to micro controllers 503, 505, and 507. Each of the micro controllers 503, 505, and 507 decodes the address stored in the latch 509. The address is indicative of with which of the micro controllers 503, 505, and 507 the CPU 401' seeks communication. Thus, when one of the micro controllers 503, 505, or 507 detects that the address stored in the latch 509 corresponds to itself, that micro controller 503, 505, or 507 accepts the data on the micro controller communications bus 501 and processes that data as a command or other data.

Micro controller 503 is an analog-to-digital (A/D) micro controller. The A/D micro controller 503 is connected via an I/O connector 511 to the vehicle battery 234 and to the backup battery 238. The A/D micro controller 503 is further connected to an RF link 532, which in turn is connected via an RJ11 connector 531 to a pager micro controller 533 and a RF micro controller 535. The pager micro controller 533 is connected to the pager receiver 245 (shown in FIGS. 2 and 3) and the RF receiver 253 (shown in FIGS. 2 and 3). The A/D micro controller 503 continuously monitors the vehicle battery 234, the backup battery 238, the RF receiver 253, and the pager receiver 245. The CPU 401' periodically polls the A/D micro controller 503 to determine if input has been received from the RF receiver 253, the pager receiver 245, or to determine whether the voltage level of either battery 234 or the backup battery 238 has dropped below a permissible level.

Micro controller 505 is an input and control micro controller. The input and control micro controller 505 is connected to the I/O connector 511 to receive inputs from various intrusion detection devices, e.g., the pin switches 203, 205, 207, and the motion detector 209.

The micro controller 505 is further connected to two relay drivers 513a and 513b. The relay drivers 513a and 513b are connected via the input/output connector 511 to relays for controlling various operations of the vehicle 200, e.g., light relay 225 (thereby controlling flashing of the lights 227, 227', 227", and 227'"), horn relay 229, and fuel line valve 223. The relay drivers 513a and 513b are connected to the various relays through the input/output connector 511.

Whereas automotive relays are typically controlled with 12 volts, logic high in computer applications, such as the control and communications unit 201, is typically approximately 5.5 volts. The role of the relay drivers 513a and 513b is to provide a 12 volt signal upon a logic high output from the input and control micro controller 505. The input and control micro controller 505 raises the control signal to logic high on command from the CPU 401'. Using two relay drivers is illustrative; a person skilled in the art that one or more relay drivers may be used to drive the relays.

The micro controller 505 is further connected via the input/output connector 511 to any digitally controllable switches, e.g., the electronic ignition module 221.

The CPU 401' is connected to the GPS receiver 219 which in turn is connected via a GPS antenna connector 529 to the GPS antenna 220.

Cellular telephone communications is plagued with a lack of a standard for the communications protocol between handsets and transceiver units. The control and communications unit 201 of the present invention is able to communicate with a cellular telephone handset 211 and transceiver unit 213 of any manufacture by having an interchangeable handset specific module 515. The interchangeable module 515 is connected to the micro controller bus 501 through a connector 517. The connector 517 may be a card edge connector and the interchangeable module 515 may physically resemble a Single Inline Memory Module (SIMM).

Micro controller 507 is a phone micro controller and is located the interchangeable module 515. The phone micro controller 515 is connected to an EPROM 521. The EPROM 521 is for example an electrically erasable read only memory (EEPROM). The EPROM 521 is programmed, when the control and communications unit 201 is installed into the vehicle 200, with information which is unique to the owner of the vehicle 200 and the particular cellular telephone transceiver 213 and handset 211. Programmable features of the control and communications unit 201 are discussed below.

For each protocol of cellular telephone handset and transceiver unit communication there is a specific interchangeable module 515. By exchanging the interchangeable module 515, a cellular telephone handset and transceiver of different manufacture may be connected to the control and communications unit 201. Thus, the architecture of the control and communications unit 201 is independent of the communications protocol used by the telephone handset and transceiver unit connected thereto.

The interchangeable module 515 is further connected to a transceiver unit RJ45 connector 523 and to a handset RJ45 connector 525.

The control and communications unit 201 further contains a modem 407'. Modem 407' performs the same functions as modem 407 of FIG. 4. The modem is connected to the interchangeable module 515 through the connector 517.

The interchangeable module 515 further contains a switching network 417' which is connected, via the connector 517 to the transceiver unit RJ45 connector 523, the handset RJ45 connector 525 and the modem 407', and, via a communications bus 527, to the phone micro controller 507. The transceiver unit 213 is connected to the transceiver unit RJ45 connector 523 and the handset 211 is connected to the handset RJ45 connector 525. The RJ45 connectors 523 and 525 are connected to connector 517, and, thus, communicate with the interchangeable module 515. The switching network 417' operates similarly to the switching network 417 of FIG. 4. A difference between switching network 417' and switching network 417 is that the CPU 401' controls of the switching network 417' by sending commands to the phone micro controller 507.

As an alternative to GPS positioning FM triangulation may be used. In such an embodiment, reception of FM station identifying call letters are received on an FM sub-carrier signal from at least three FM stations. The call letters of the three FM signals and the direction of the strongest reception for each FM station are transmitted to the central monitoring station 103. Using triangulation algorithms, the central monitoring station 103 is then able to calculate the position of the vehicle.

Figure 6:
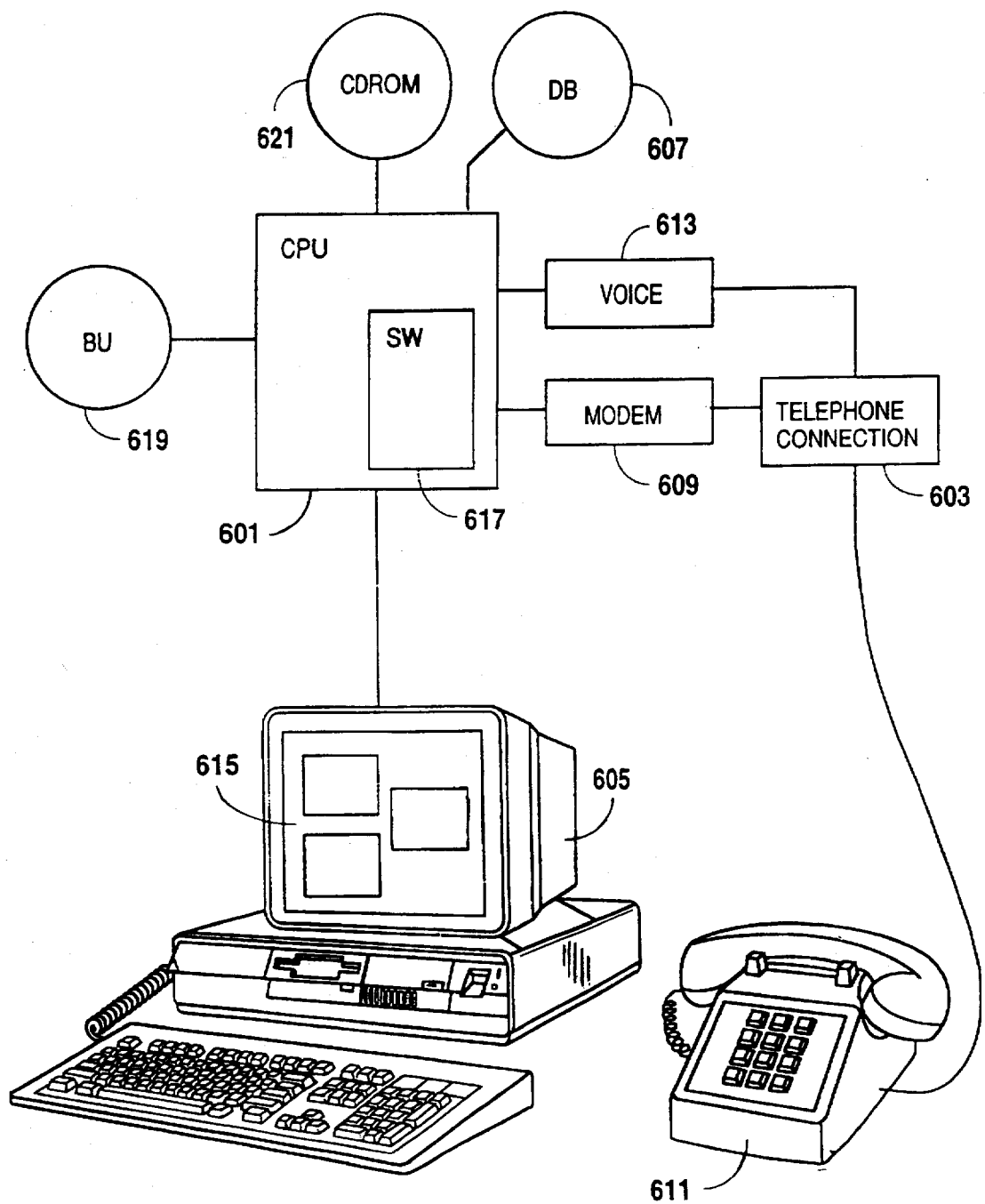
FIG. 6 is a block diagram of the equipment in the central monitoring station.

FIG. 6 is a block diagram of the equipment in the central monitoring station 103. The core of the central monitoring station 103 is a computer system 601. The computer system 601 may be any of a large variety of general purpose computers, e.g., a multi-user UNIX system. In an alternative embodiment the computer system may be a number of networked single user computers, e.g., IBM PC compatible computers. The operations of the central monitoring station 103 is controlled by software 617 loaded into the memory (not shown) of the computer system 601.

One or more operator consoles 605 are attached to the computer system 601. The operator consoles may be either terminals connected to the computer system 601 or computers in their own right, in which case, each is connected in a client-server relationship to the computer system 601.

The computer system 601 is further connected to a database 607. The database 607 is typically stored on a hard disk and may be a relational database managed by a database management system such as SQL. The database 607 contains a variety of information about each vehicle monitored by the central monitoring station 103.

The following is an exemplary list of information stored in the database 607:

identifying key (e.g., a unique identifier for each vehicle)

Make, model and year model of the vehicle license plate number

Color of the vehicle

Owner

Owner's Address and telephone numbers

Telephone number for the cellular telephone in the vehicle

Voice samples of the owner of the vehicle and other authorized users

Photographic image of the owner and other authorized users

Last known location, direction and speed of the vehicle.

Status, e.g., "Intrusion zone violated", "vehicle left designated area", "vehicle Special instructions: e.g., "on violation of an intrusion zone immediately disable the ignition" or "on violation of an intrusion zone allow vehicle to operate for five minutes then disable the ignition and disable the power door locks and power windows", "owner on vacation, vehicle should not leave airport parking lot for next two weeks".

The CPU 601 is connected to telephone network 603 via a modem 609. Via the modem 609 the CPU 601 receives information pertinent to any vehicle which is in communication with the central monitoring station 103.

A voice telephone 611 is also connected to the telephone network 603. An operator of at the central monitoring station 103 uses the voice telephone 611 to talk to the occupants of a vehicle 200 or to listen for any sounds from within a vehicle 200, e.g., conversation between its various occupants. Such conversation may be indicative of a carjacking in progress or other criminal activities.

The computer system 601 is also connected to a voice unit 613 for artificially creating voice output from digitally stored text. Many operations of the central monitoring station may be fully automated, but require the interaction with human beings. For example, when the security system 300 of a vehicle 200 has detected an unpermitted intrusion, the monitoring station 103 may automatically call the residence of the owner of the vehicle. This call may be made by an automated voice. Similarly, certain communication may be made with the occupants of the vehicle over the cellular telephone system, e.g., "Please identify yourself". These communications may also be partially automated.

The operator console 605 contains a graphic user interface (GUI) display 615. When a vehicle has contacted the central monitoring station concerning an alarm situation, a window containing database information is displayed on the GUI display 615. Another window displays a street map of the vicinity of the current location of the vehicle. Mapping software in the operator console 605 or in the computer system 601 allows the operator to display street names on the map window and to zoom in and out of the map. Maps, e.g., vector maps are stored either in the database 607 or on separate CD ROM 621. The maps may be based upon U.S. Census Bureau Tiger files.

The windowing environment of the GUI display 615 provides control of simultaneous calls from multiple vehicles. Upon the receipt of a call from a vehicle, the software 617 resident in the central monitoring station 103 automatically initiates a handshake protocol with the calling vehicle and automatically begins logging location, direction and speed data into the database 607. The software 617 displays and tracks the vehicle position in a map window on GUI display 615, logs the position information to a backup file 619, and displays the database information on the vehicle 200.

The software 617 also provides the operator with the functionality to control the vehicle 200. The operator controls the vehicle 200 by sending control messages to the security system 300 of the vehicle 200.

The software 617 has the following modes of operation which are selectable by an operator by way of a menu on the GUI display 615:

POSITIONING—this is the default mode in which the central monitoring station 103 tracks the vehicle's position and allows command messages to be sent to the unit.

LISTEN—when this mode is selected, all MODEM data is terminated and an operator at the central monitoring station 103 may listen to noises picked up by the microphone 211c of the cellular telephone handset 211.

VOICE—when this mode is selected, all MODEM data is terminated and the operator may speak with an occupant of the vehicle using the cellular telephone handset 211.

The software 617 provides the following functionality:

Zoom in or out on a map displayed on the GUI display 615 for better resolution.

Display all surrounding street names automatically.

Display any chosen street name.

Display the current county and state.

Display detailed information about the vehicle and its owner from the database 607.

Send control messages to the security system 300 of the vehicle to control operation of the vehicle by switching relays, etc.

Read the position, direction, and speed of the vehicle.

Playback a log file (of past position, direction, and speed of the vehicle) at high speed.

Display the police jurisdiction in which the vehicle 200 is currently located.

Figure 7:
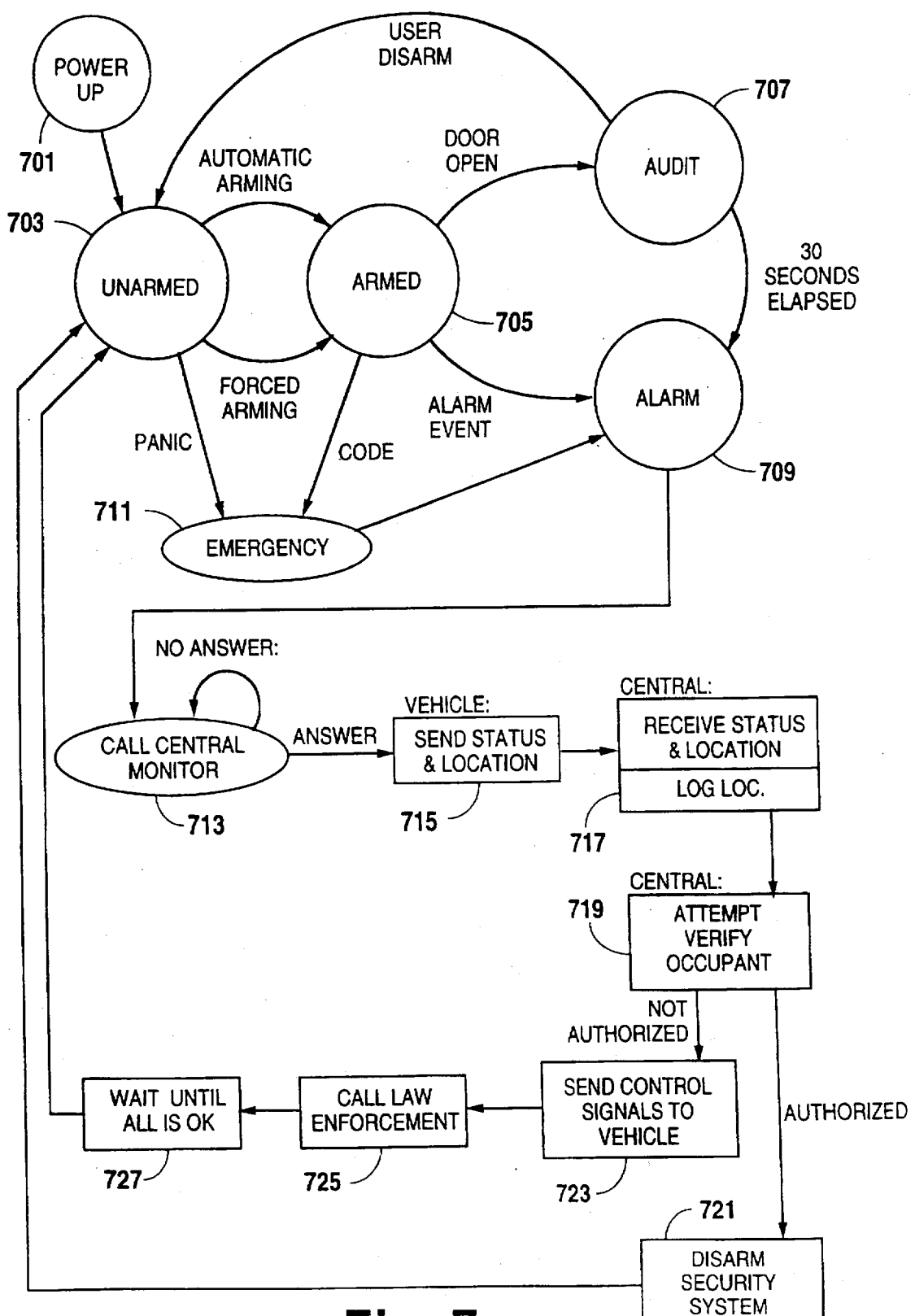
FIG. 7 is a state transition diagram showing the interaction between the security system of a vehicle and a central monitoring station according the present invention.

FIG. 7 is a state transition diagram showing the interaction between security system 300 and the central monitoring station 103 and the various states of the security system. The system starts in a power up state, state 701. State 701 is described in greater detail below in conjunction with FIG. 10(a). An automatic transition is made to the UNARMED state 703. Two separate paths are possible from the UNARMED state 703, first, the automatic arming of the system on certain predefined conditions, e.g., all doors closed and the ignition off for a specified amount of time, and, second, the forced arming of the system by the user entering a code on the handset keypad 211b or by voice activation, i.e., by speaking verbal commands through the handset microphone 211c. Both of these transitions lead to the ARMED state 705.

There are two transitions possible from the ARMED state 705. First, an event which leads the system into AUDIT mode, state 707. An example of such an event is the opening of a door. In AUDIT mode the occupant of the vehicle has a specified amount of time to disarm the system. Failure to disarm the system within the specified time period causes an alarm condition, exemplified in the diagram by a transition to the ALARM state 709. If the system is disarmed within the specified audit period, a transition is made back to the UNARMED state 703.

An alarm condition can also occur directly from the ARMED state 705. Any violation of an intrusion zone which is not in the category that leads the system into AUDIT state 707 leads the system in the ALARM state 709.

From either the UNARMED state 703 or the ARMED state 705, the EMERGENCY state 711 can be entered by the user entering an emergency code on the cellular telephone handset keypad 211b or by speaking a voice command through the microphone 211c. The EMERGENCY state 711 has an automatic transition to the ALARM state 709, where "emergency" is one type of alarm condition.

From the ALARM state 709 a call is made to the central monitoring station to report the event, e.g., an emergency, an intrusion detection zone violation, a carjacking, or an emergency vehicle request, action state 713. If the central monitoring station does not answer the call, state 713 is repeated. Once the central monitoring station 103 answers the call, the security system 300 sends the current status (e.g., EMERGENCY) and the vehicle's location (as determined by the GPS receiver 219) to the central monitoring station 103, state 715. Next, the central monitoring station 103 receives the information sent in state 715, and, in turn, logs the status and location information, state 717.

Next, the central monitoring station 103 attempts to verify that the occupant is an authorized user of the vehicle 200, state 719. The verification process may be accomplished either by accepting a security code which the occupant of the vehicle 200 enters on the cellular telephone handset 211b, by accepting voice input from the cellular telephone microphone 211c, or by observing an image of the occupant obtained by the camera 233.

If the central monitoring station 103 verifies that the occupant of the vehicle 200 is an authorized occupant of the vehicle 200, the central monitoring station 103 causes the security system to disarm, state 721, and a transition is made to the UNARMED state, 703.

However, if from state 719 it is determined that the occupant is not an authorized occupant of the vehicle 200, or if it is determined that a carjacking is in progress, then the central monitoring station 103 sends control signals to the vehicle, state 723, and calls law enforcement officials to inform them about the crime in progress and the location of the vehicle, state 725.

The central monitoring station then waits for the alarm situation to be resolved in some way, state 727, e.g., by the determination that a false alarm occurred or by the successful recovery of the vehicle 200.

Figure 8A:
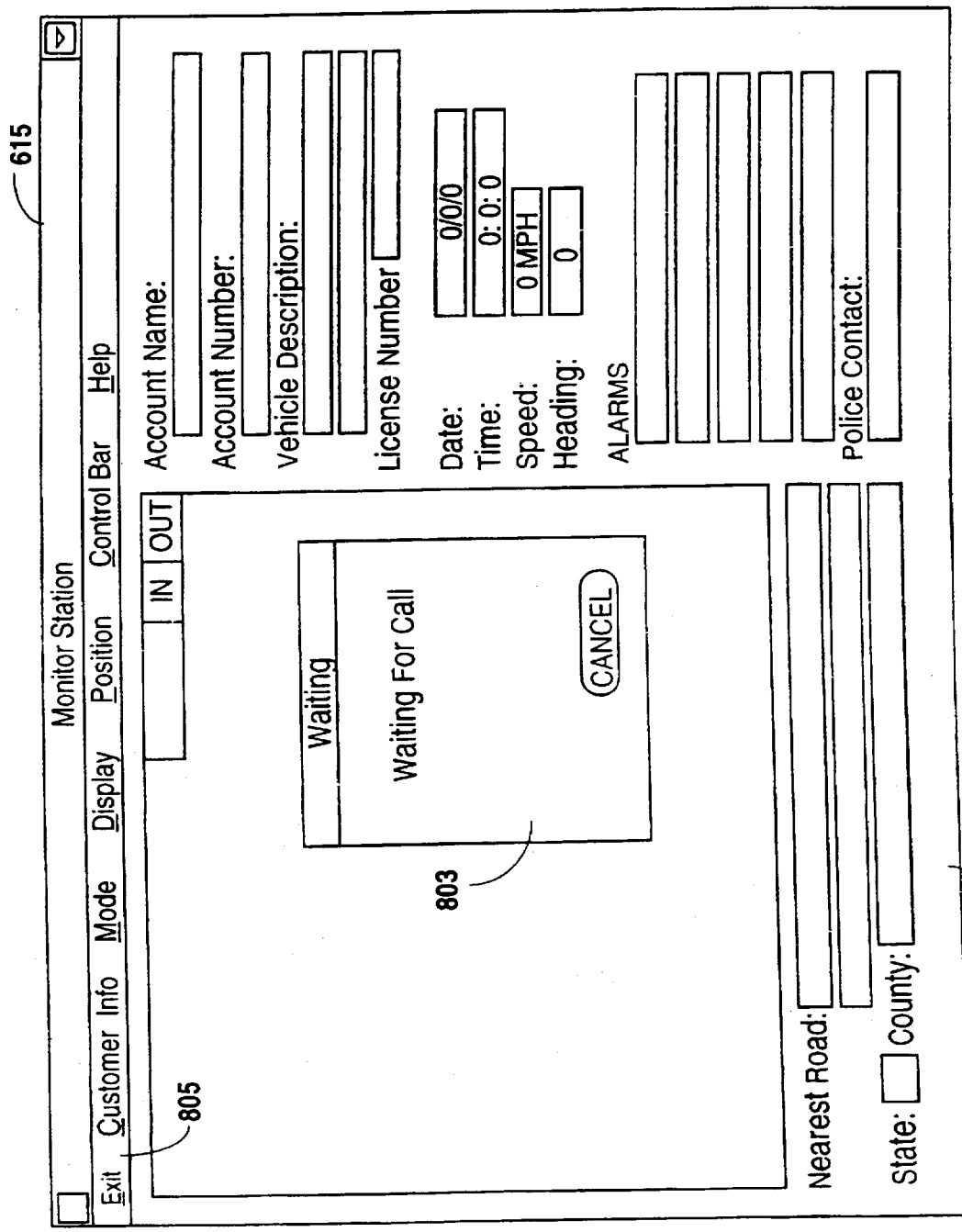

FIGS. 8(a) through 8(i) illustrate the interaction through the GUI 615 of FIG. 6 in a exemplary session at the central monitoring station 101. FIG. 8(a) shows the central monitoring station awaiting a call from a vehicle 200. The GUI 615 shows a main interaction window 801 and a "waiting" window 803. The GUI 615 further contains a menu bar 805 containing menus by which the operator may select between various commands of the central monitoring station 103.

Figure 8B:
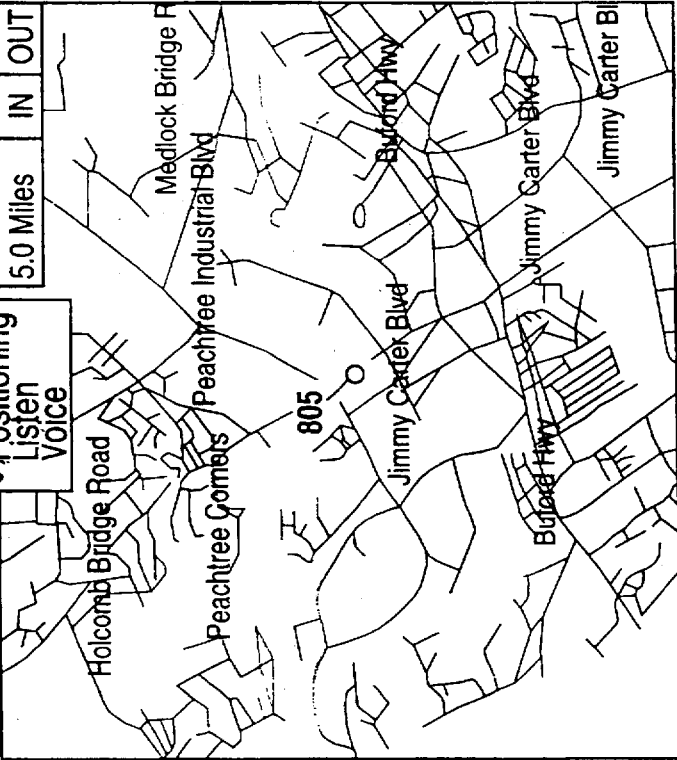

FIG. 8(b) shows the interaction after an alarm event in a vehicle 200. In particular, the GUI 615 communicates, to the operator the name and the account number of the owner of the vehicle 200 that has a triggered alarm, and information describing the vehicle. Furthermore, the GUI 615 communicates the location of the vehicle 200 by showing a map with a dot 805 indicating the position of the vehicle with respect to the map, and by displaying the name of the nearest street as well as the name of the state and the county wherein the vehicle 200 is currently located. The GUI 615 also displays to the user the current date and time, and the speed and heading of the vehicle. Furthermore, the GUI 615 indicates what type of alarm condition has occurred and the telephone of the appropriate law enforcement agency.

Figure 8C:
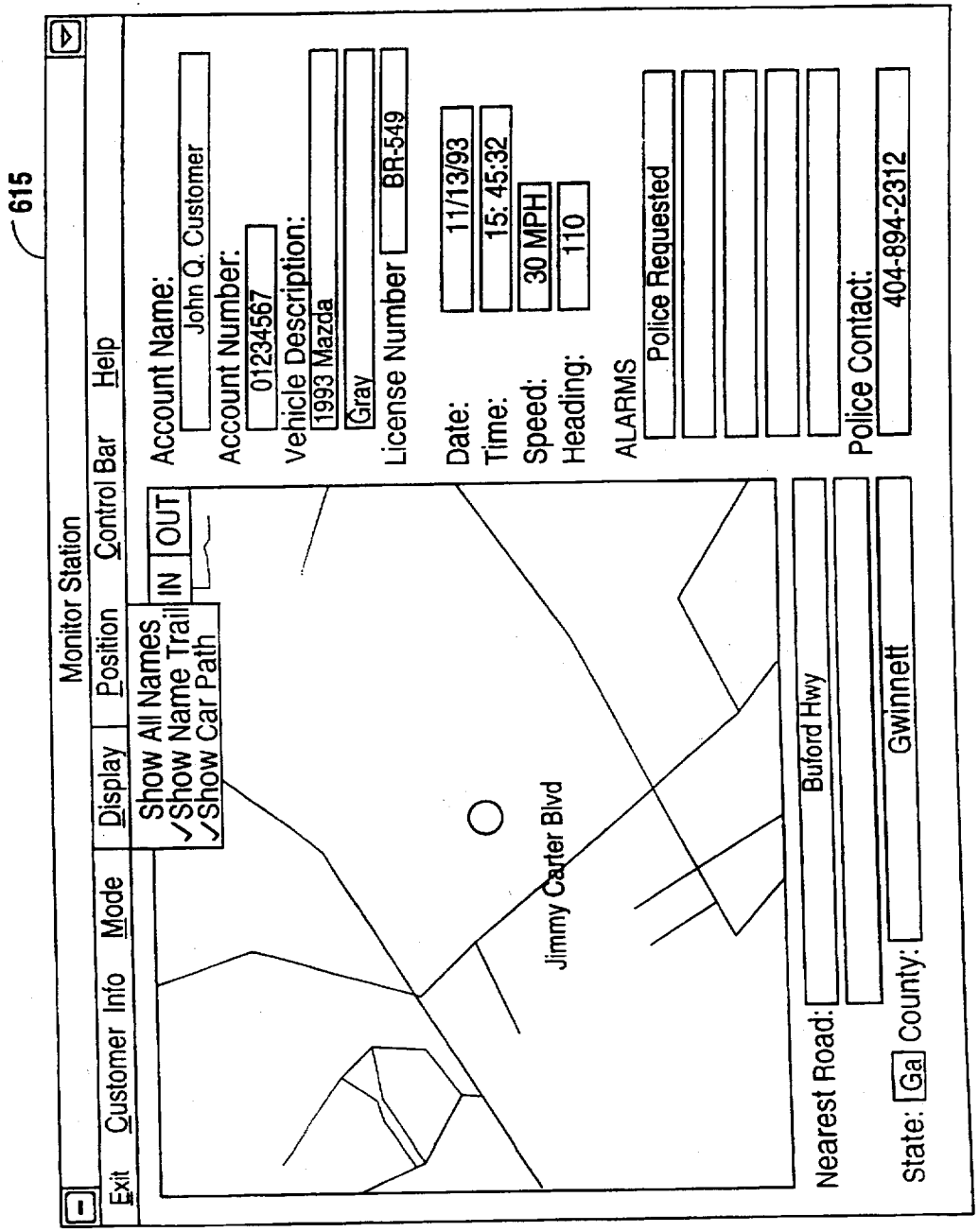
Figure 8D:
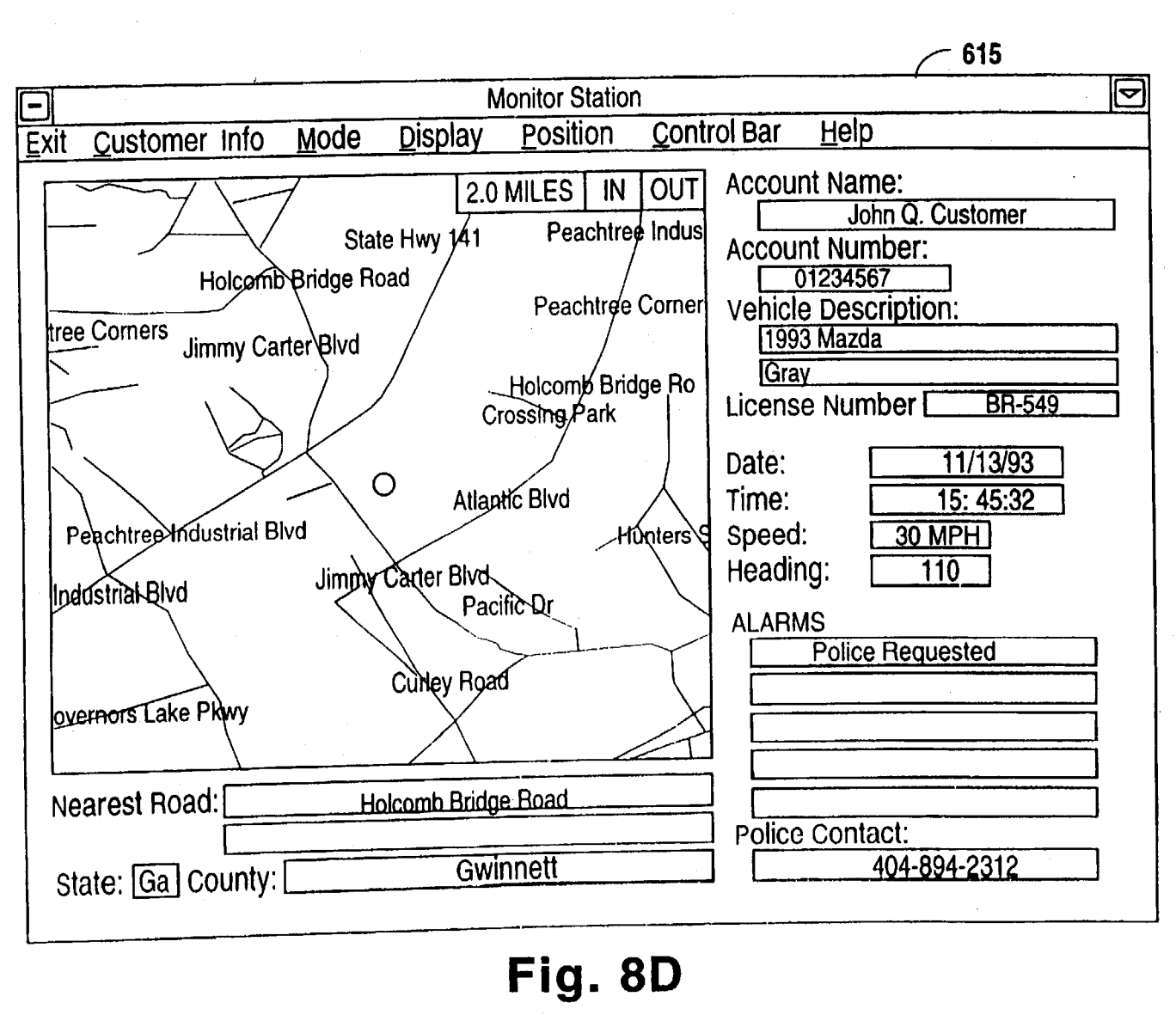

FIGS. 8(c) and 8(d) shows two different options of showing names of streets on the map of the GUI 615. In FIG. 8(c), the name of only one street is shown. However, the user has pulled down a menu with an option for displaying all street names. Selecting this option causes the display of FIG. 8(d), in which all street names are shown.

FIG. 8(e) shows a customer information window displayed after the selection of the "Customer Info" menu. The customer information window contains information about the owner of the vehicle.

Figure 8F:
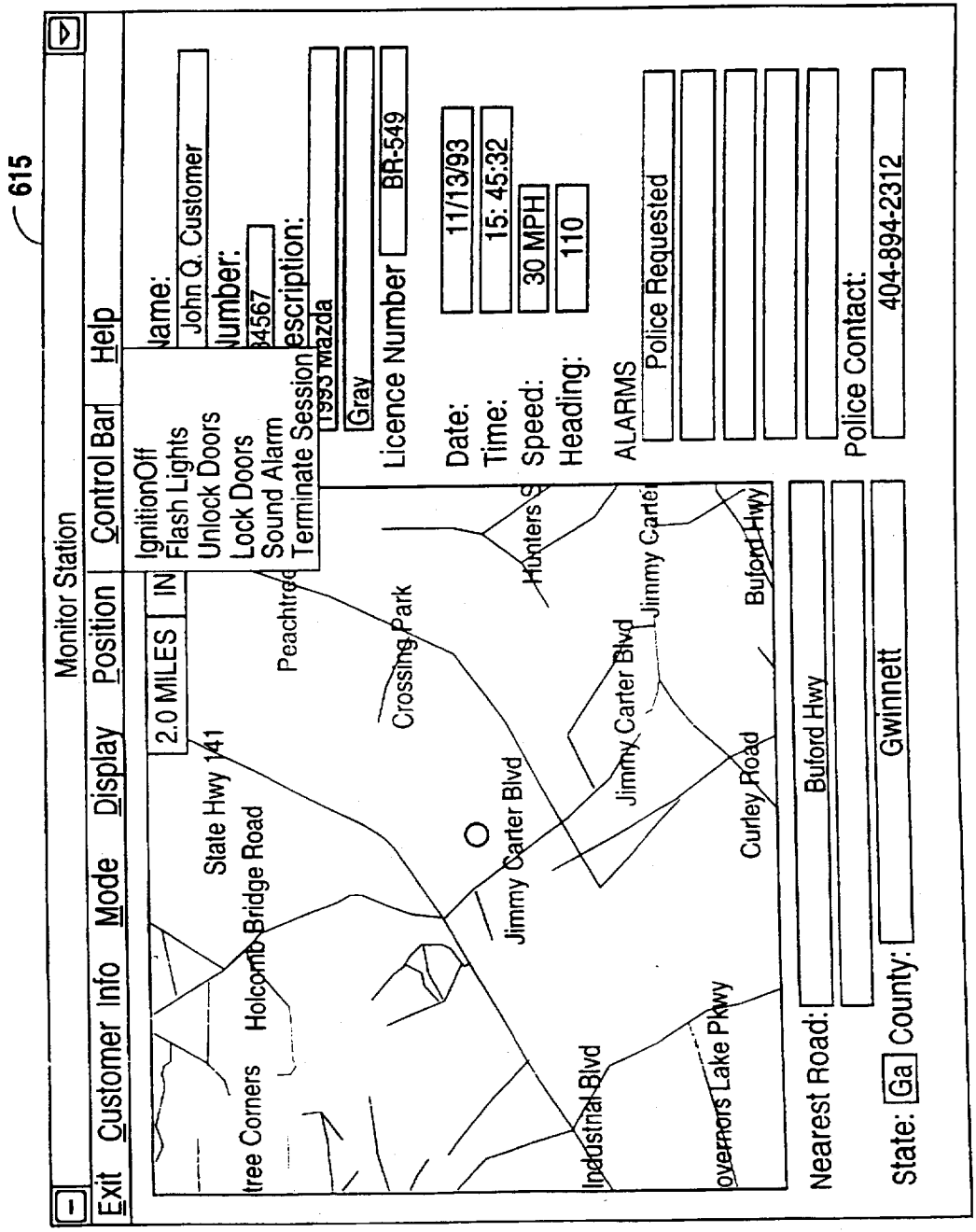

FIG. 8(f) shows an interaction in which the operator of the central monitoring station 103 has pulled down the "control car" menu. Through the control car menu the operator may cause the central monitoring station 103 to send commands to the vehicle 200 to shut off the ignition, to flash the lights, to unlock the doors, to lock the doors, to sound the alarm, or to acknowledge the alarm.

Figure 8G:
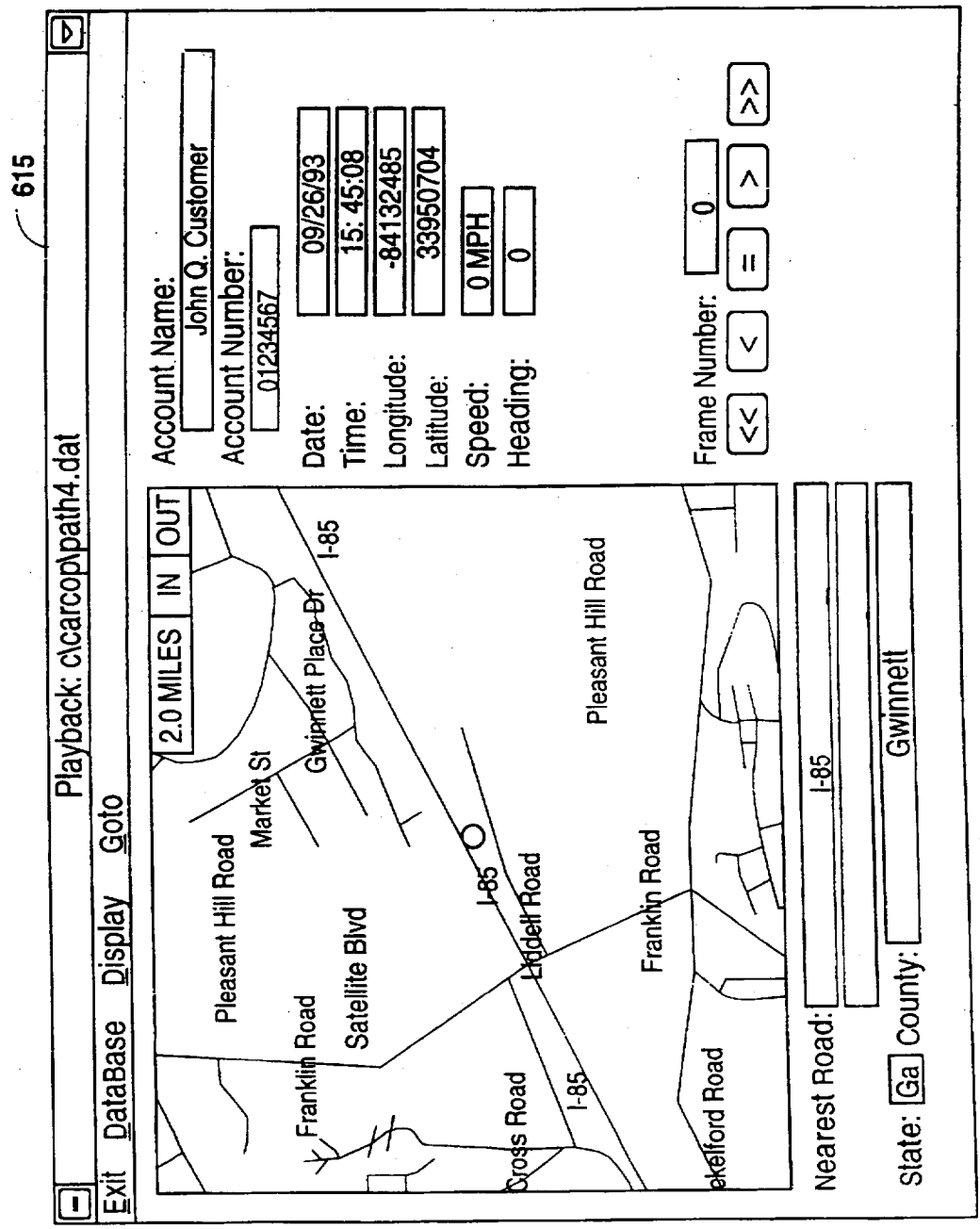
Figure 8H:
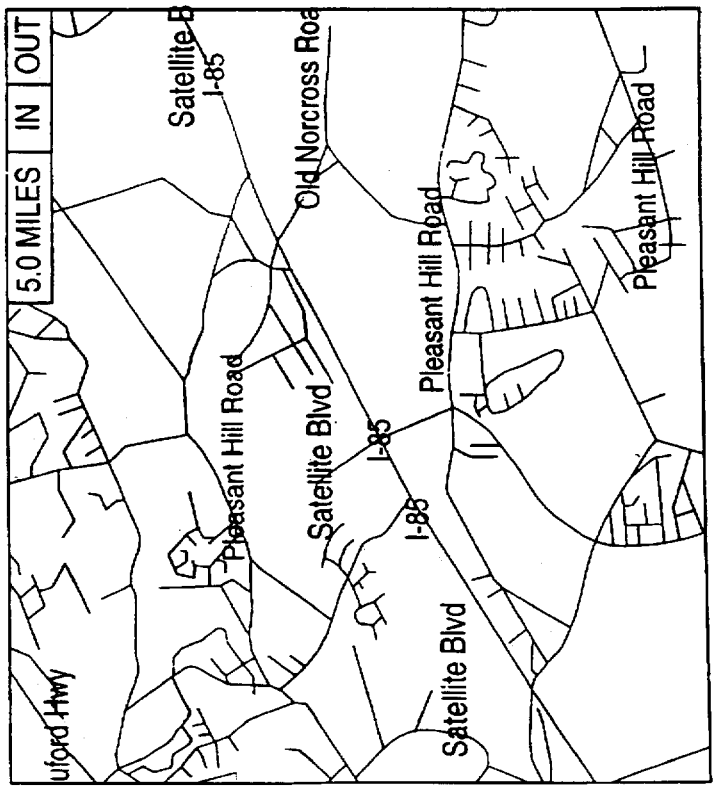
Figure 8I:
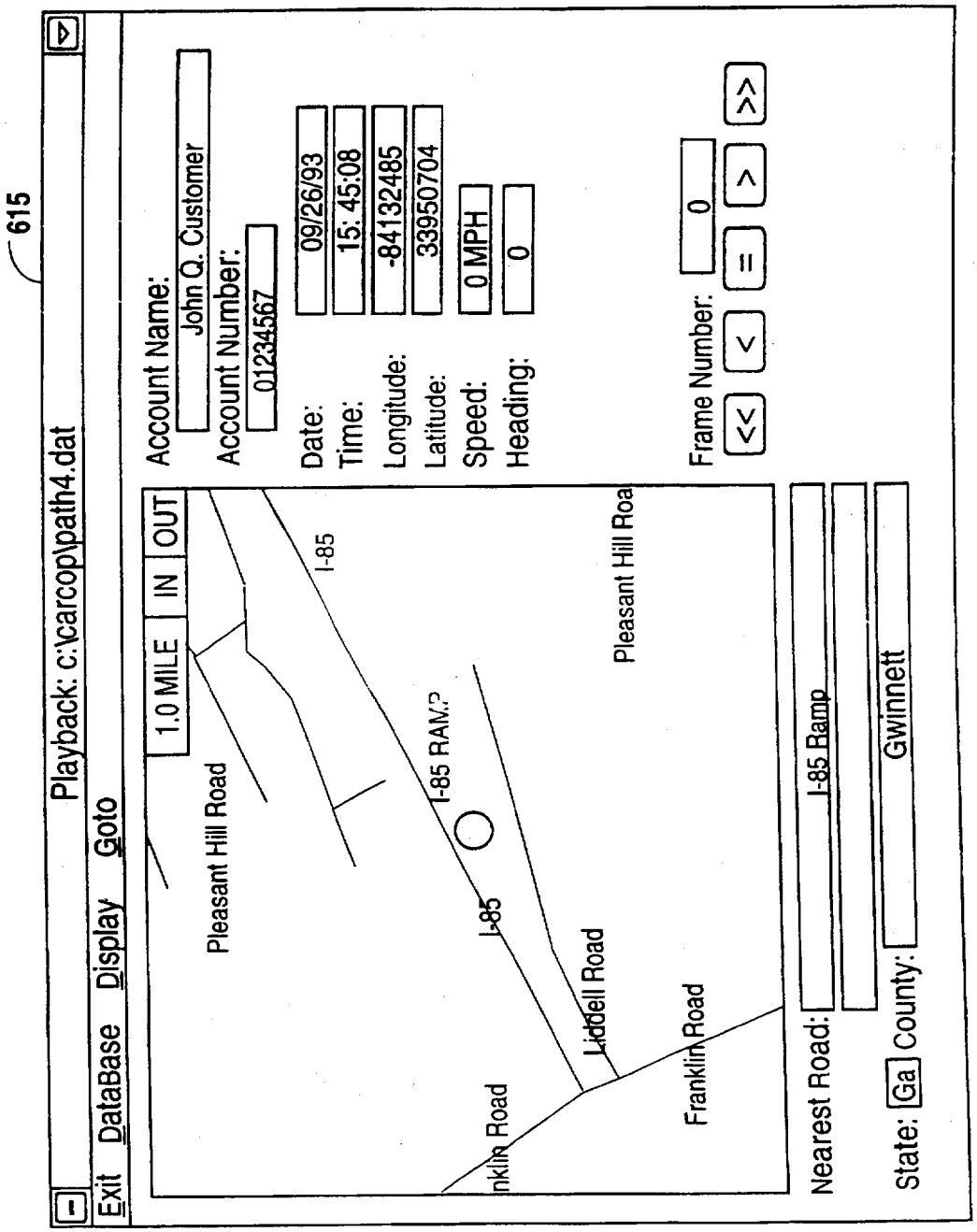

FIGS. 8(g) through 8(i) show the zooming in and zooming out feature of the central monitoring station GUI 615. In FIG. 8(g) the map window displays a map of a geographic region that is 2 miles square, in FIG. 8(h) the map is shown at a scale of 5 miles square, and in FIG. 8(i) the map is shown at a scale of 1 mile square.

Figure 9A:
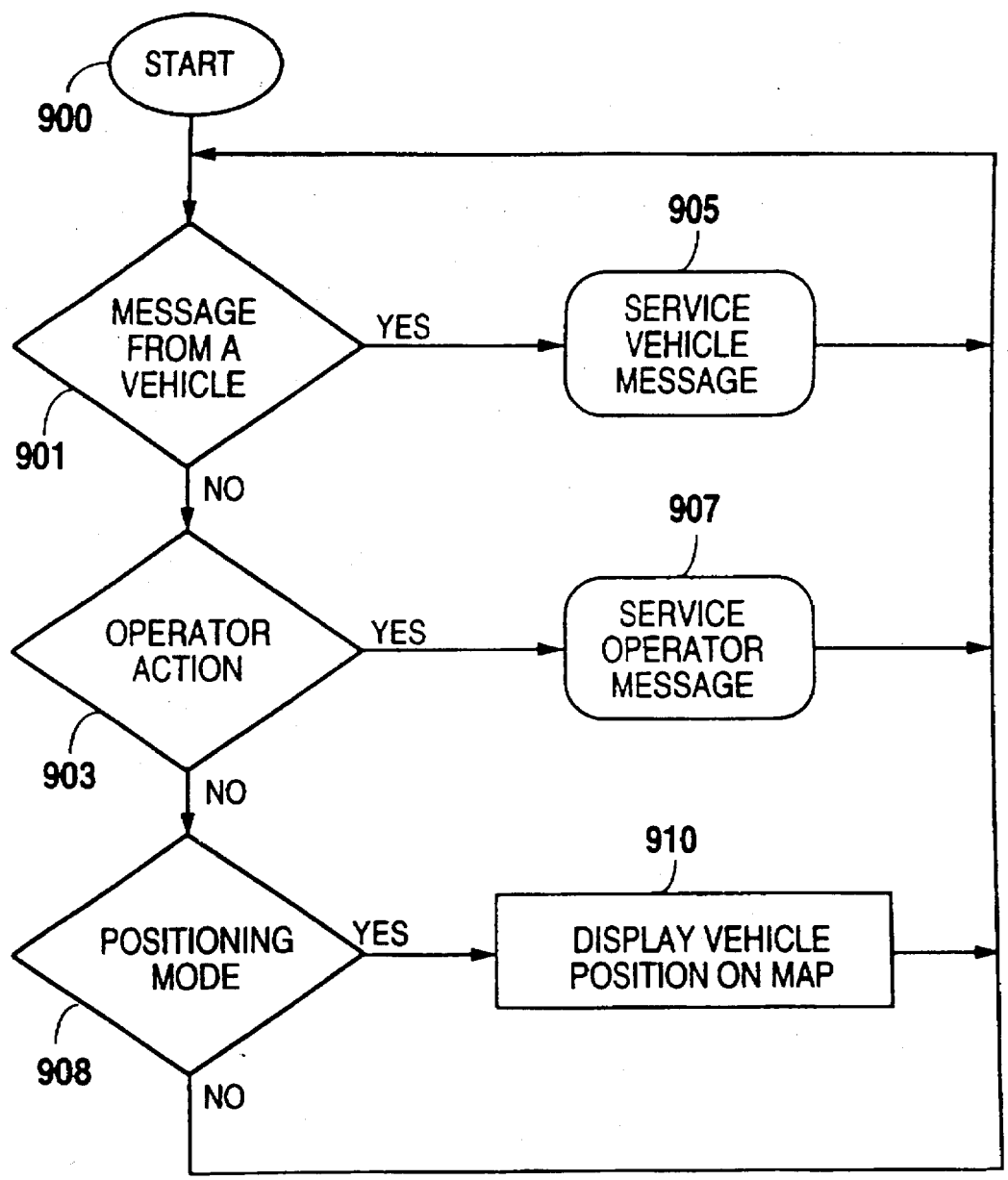
FIGS. 9(a) through 9(c) are flow diagrams showing the operation of the central monitoring station of FIG. 6.
Figure 9B:
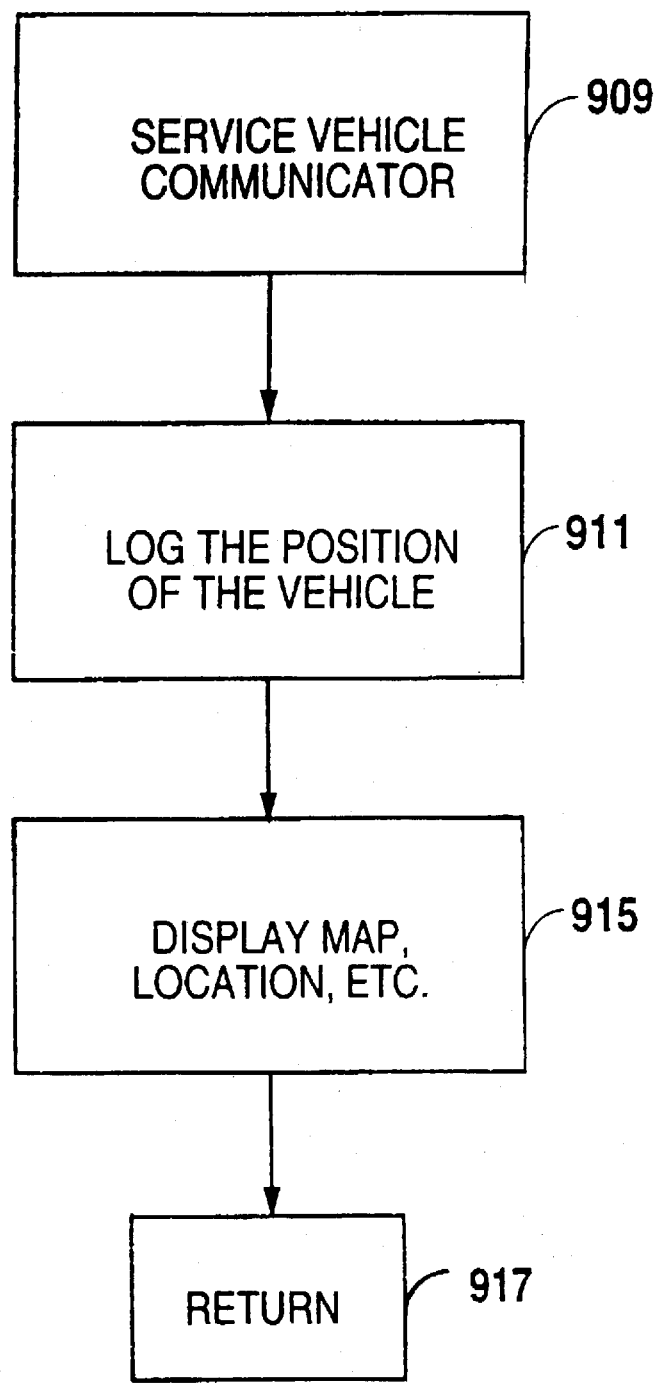
Figure 9C:
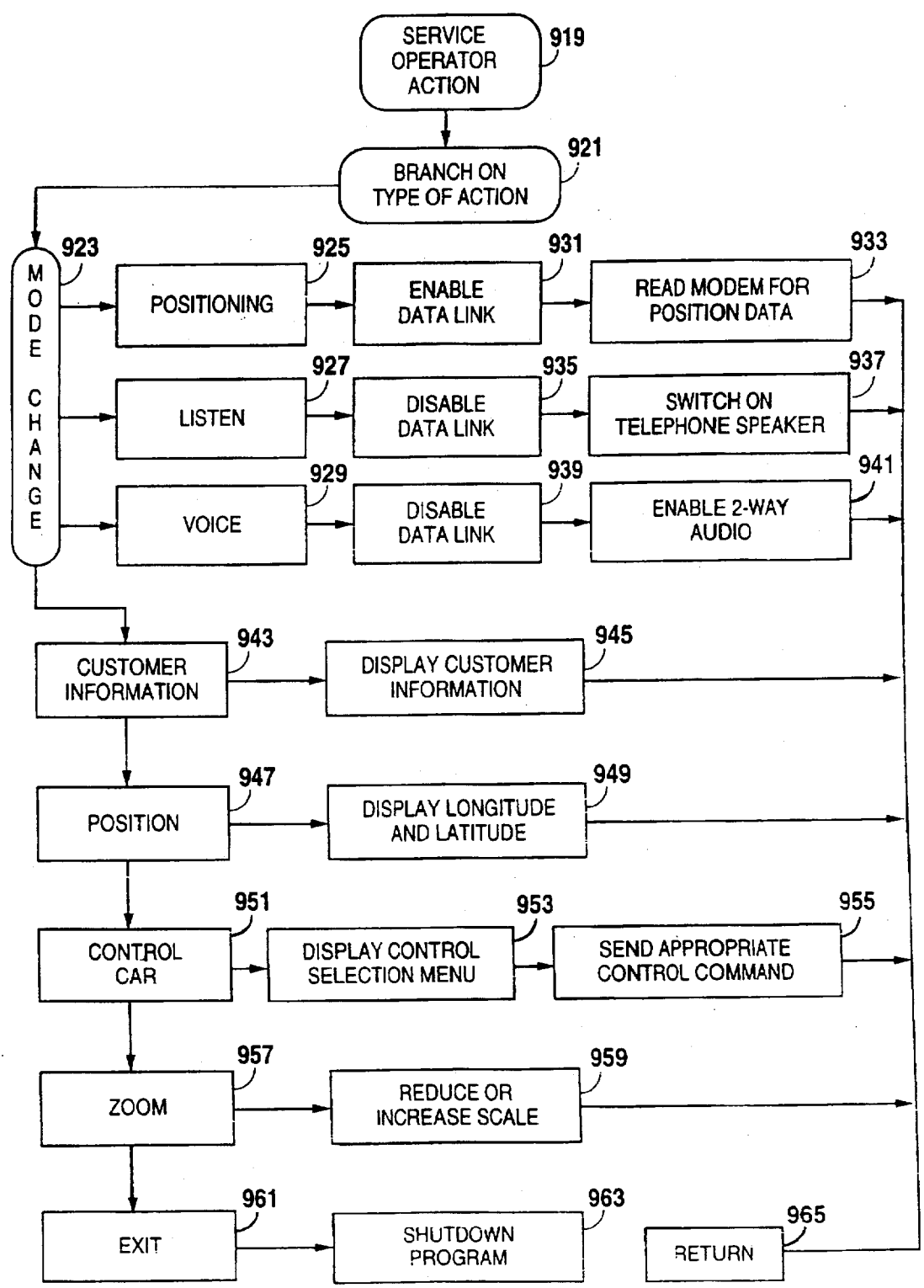

FIG. 9 is a flow chart of the operations of the software 617 in the central monitoring station 103. FIG. 9(a) shows the main program of the software 617, which starts at entry point 900. The software 617 operates on an infinite loop basis alternatively checking for input from the vehicles monitored by the central monitoring station 103, step 901, and from operator at central monitoring 103, step 903. If an input has been received from a vehicle 200, a call is made to a SERVICE-VEHICLE-COMMUNICATION procedure (described in conjunction with FIG. 9(b)), step 905. If an input is received from the operator, a call is made to a SERVICE-OPERATOR-COMMUNICATION procedure (described in conjunction with FIG. 9(c)), step 907.

If the user interface is currently executing in POSITIONING mode, set from the mode menu (see FIG. 8(b)), as determined by decision box 908, the vehicle's current position is displayed on the map on the GUI 615, step 910.

The main program of the central monitoring station software 617 is an infinite loop. Thus, after any of steps 905, 907, 910, and the NO branch from decision box 908, control is returned to the beginning of the program, at decision box 901.

FIG. 9(b) is a flowchart showing the operation of the SERVICE-VEHICLE-COMMUNICATION procedure, entry point of which is 909. The first step of the procedure is to log the position of the vehicle into a log file in the backup file 619, step 911. Next, the SERVICE-VEHICLE-COMMUNICATION procedure displays a map of the vicinity of the location of the vehicle, the location of the vehicle, owner information, and vehicle data, onto the GUI 615, as shown in FIG. 8(b), step 915. Finally, the SERVICE-VEHICLE-COMMUNICATION procedure returns control to the calling program, step 917.

FIG. 9(c) is a flowchart showing the operation of the SERVICE-OPERATOR-ACTION procedure which commences at entry point 919. The flow of control through the SERVICE-OPERATOR-ACTION procedure is controlled by a branch selection statement 921. The branch selection statement 921 selects a branch of the SERVICE-OPERATOR-ACTION procedure based on what type of action the operator has selected. There is one branch for each action and the branches shown in FIG. 9(c) should be considered as illustrative examples rather than as an exhaustive list. The first branch is the "mode change" branch 923, which in turn is a branch selection between the "positioning" branch 925, the "listening" branch 927, and the "voice" branch 929.

The first step of the "positioning" branch 925 is to enable a data link between the central monitoring station 103 and the vehicle 200 which has called in an alarm, step 931. On start up the data link is enabled so that an alarm condition can be communicated from the vehicle 200 to the central monitoring station 103. However, subsequent mode changes (into VOICE or LISTEN modes) disable the data link. Next, the modem 609 is polled for position data from the vehicle 200, step 933.

The first step of the "listen" branch 927 is to disable the data link, step 935. Next, the speaker of the telephone 611 is turned on so that the operator can listen to any sounds made inside the vehicle 200.

The first step of the "voice" branch 929 is to disable the data link, step 939. Next, both the speaker and the microphone of the telephone 611 are turned on so that the operator can both speak and listen to the vehicle, step 941. When the operator has selected to display customer info, branch 943, the information about the owner of the vehicle is displayed in a GUI 615 window as shown in FIG. 8(e), step 945. One piece of information displayed is the identification code associated with the owner of the vehicle. The operator of the central monitoring station 103 may use the "voice" mode to verify that the occupant of the vehicle 200 knows the password.

If the operator has selected the "position" menu item, branch 947, the longitude and latitude of the vehicle's current position is displayed, as is shown in FIG. 8(g), step 949.

If the operator has selected to control some function of the car by pulling down the "control car" menu, branch 951, that menu is displayed, as shown in FIG. 8(f), and a selection is accepted, step 953 and the appropriate command is sent to the vehicle 200, step 955.

If the operator has selected to zoom in or out of the map, branch 957, the scale of the map is increased or decreased as requested, step 959.

If the operator has selected to page the security system 300 of a particular vehicle 200, branch 967, the computer 601 causes the modem 609 to dial a pager telephone number, step 969. All vehicles monitored by the monitoring station 103 receive data on the same telephone number. Next, an identifying code, unique to the particular vehicle being paged, is transmitted via the telephone system, step 971. Every vehicle is assigned a unique code. Only the vehicle with a code matching the code transmitted responds to the page. Following the transmission of the vehicle identifying code, a command is sent to the vehicle, step 973.

If the operator has selected to exit the program, branch 961, the program is shutdown, step 963.

For all branches other than the exit branch 961, after the execution of all steps of the branch, control is returned to the calling program, 965.

Figures 10A, 10B:
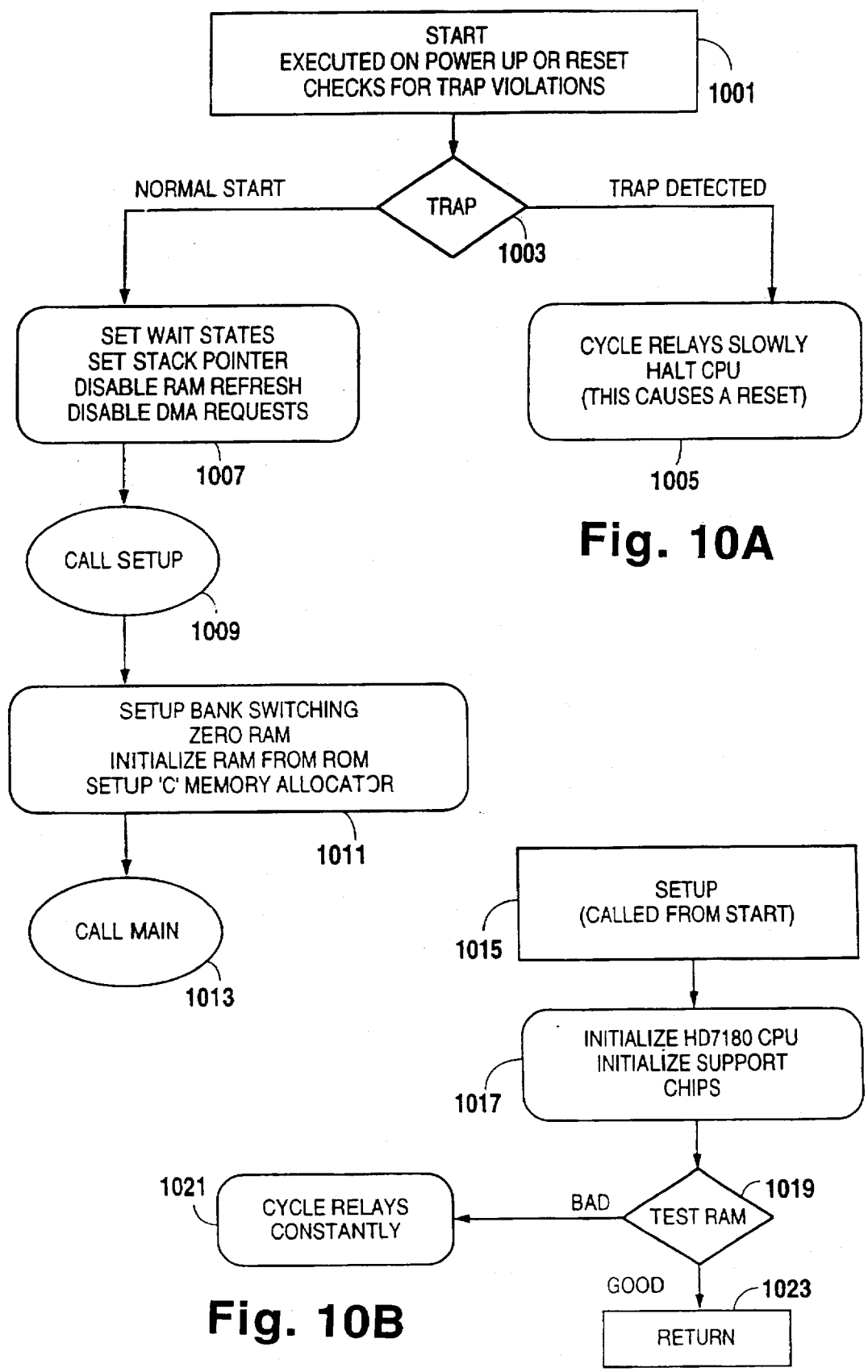
FIG. 10(a) through FIG. 10(o) are flow charts of the operation of the equipment of the mobile units of the security system according to the present invention.
Figure 10C:
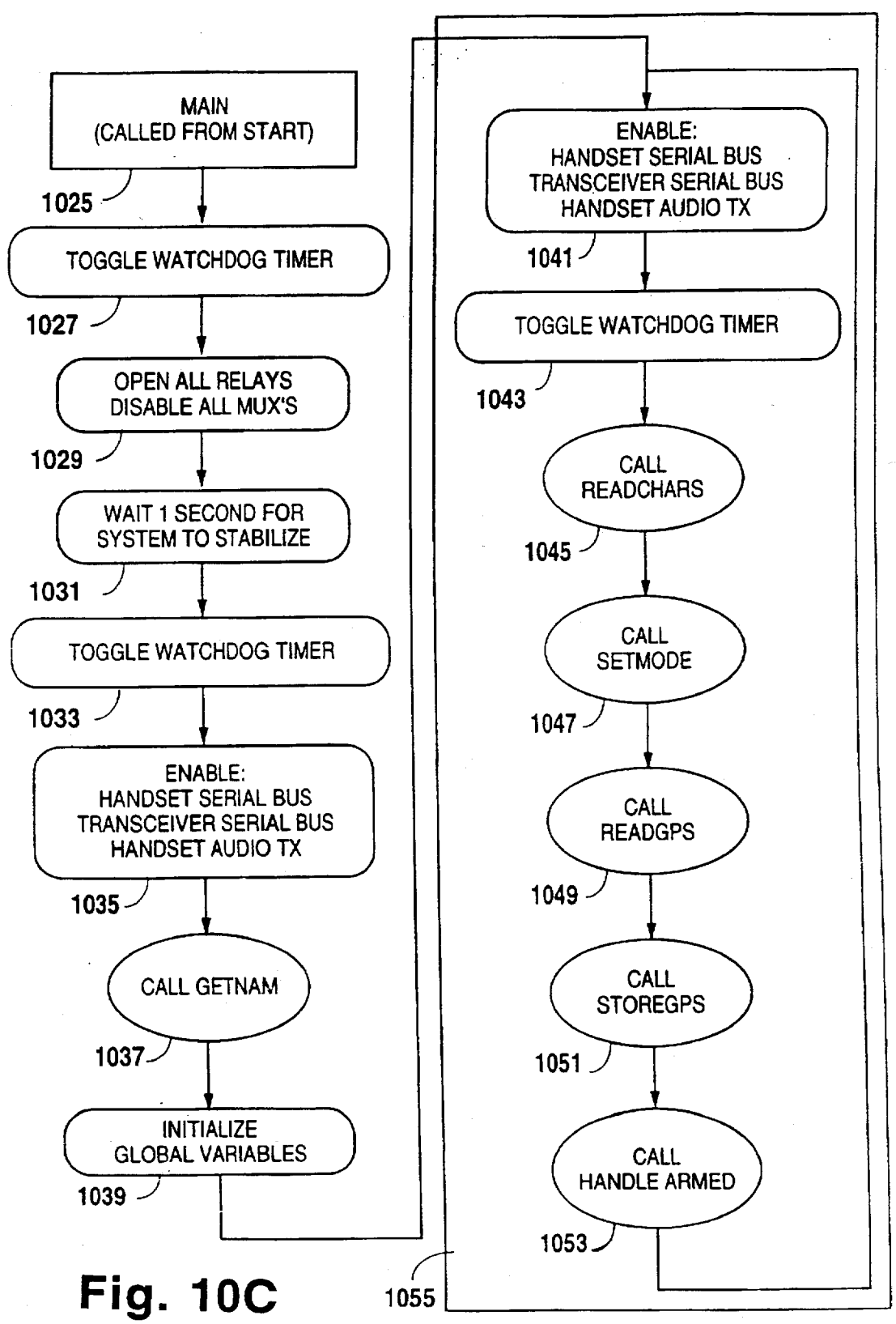
Figure 10D:
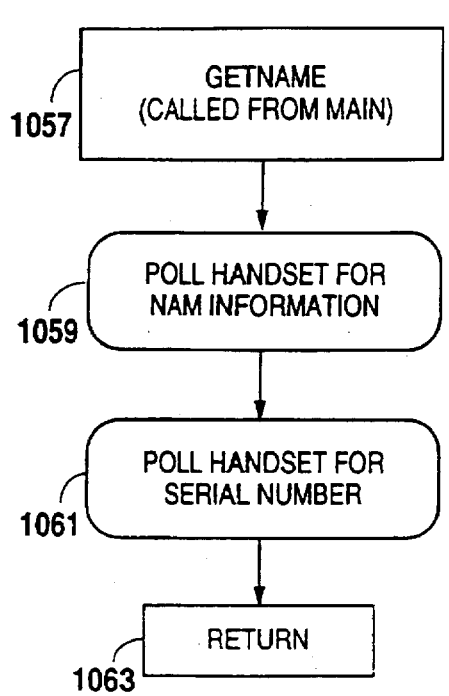
Figure 10E:
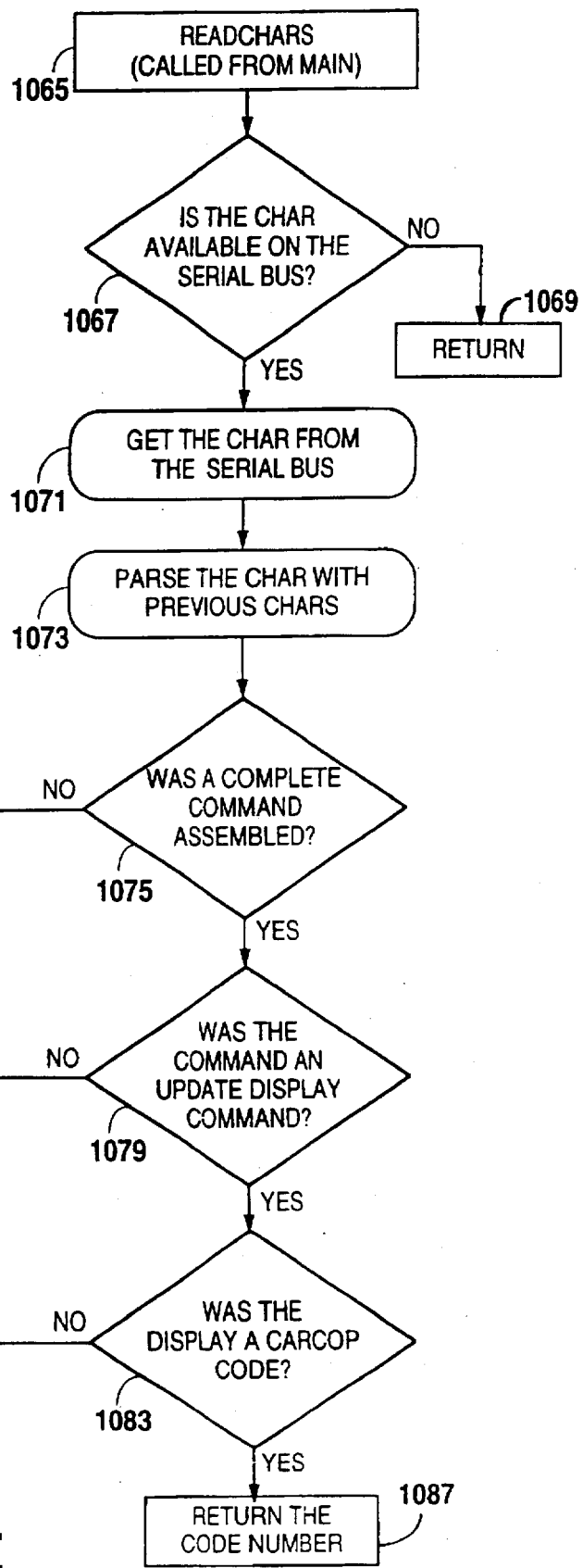
Figure 10F:
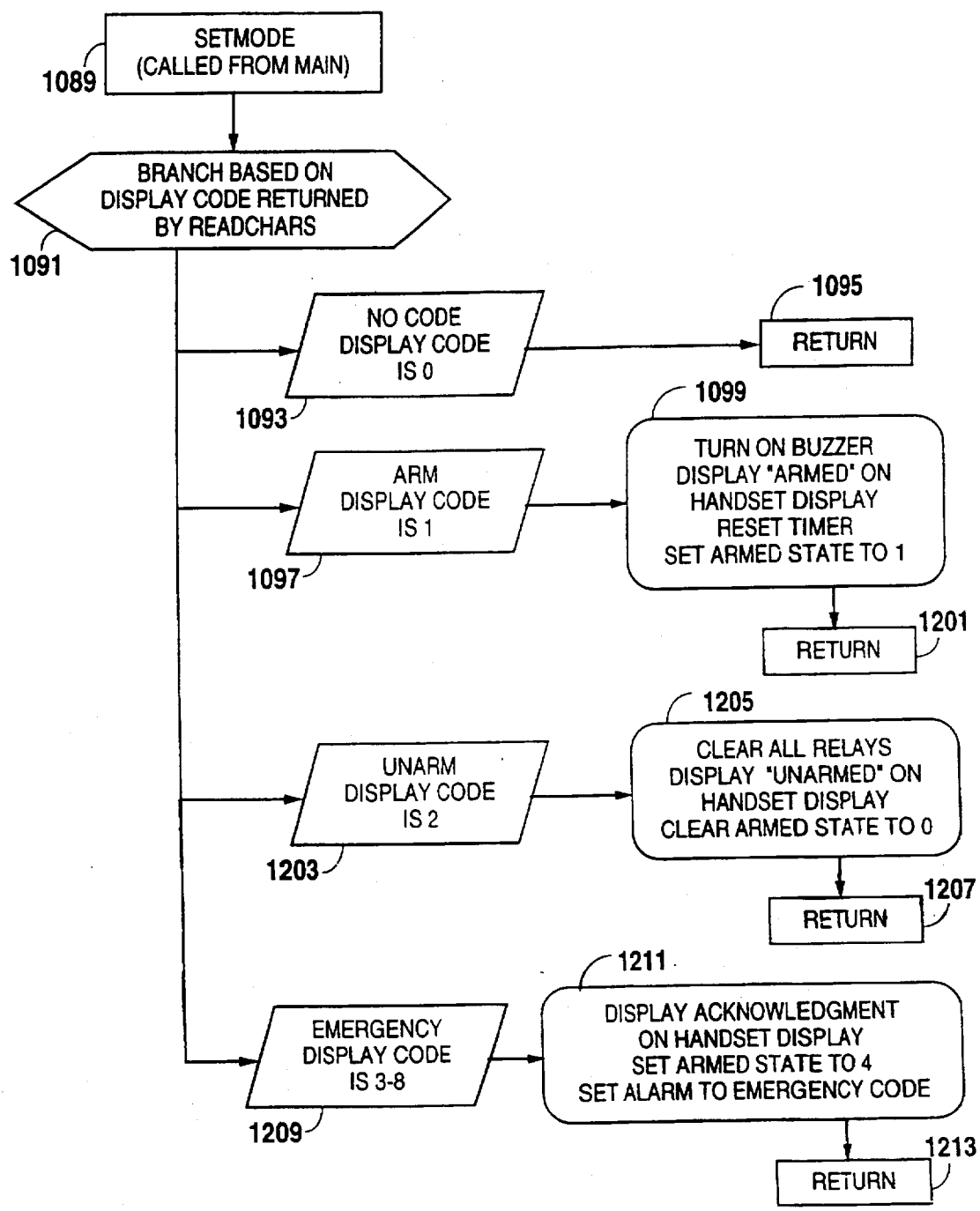
Figure 10G:
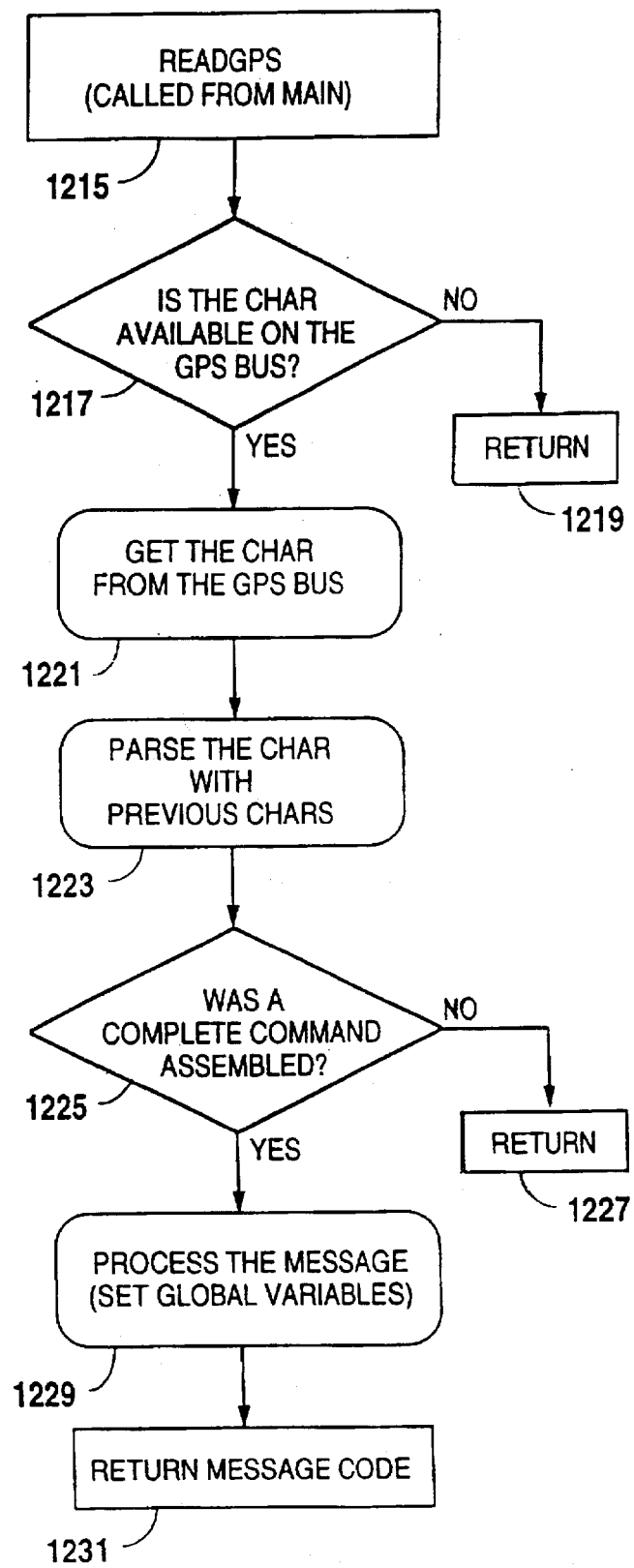
Figure 10H:
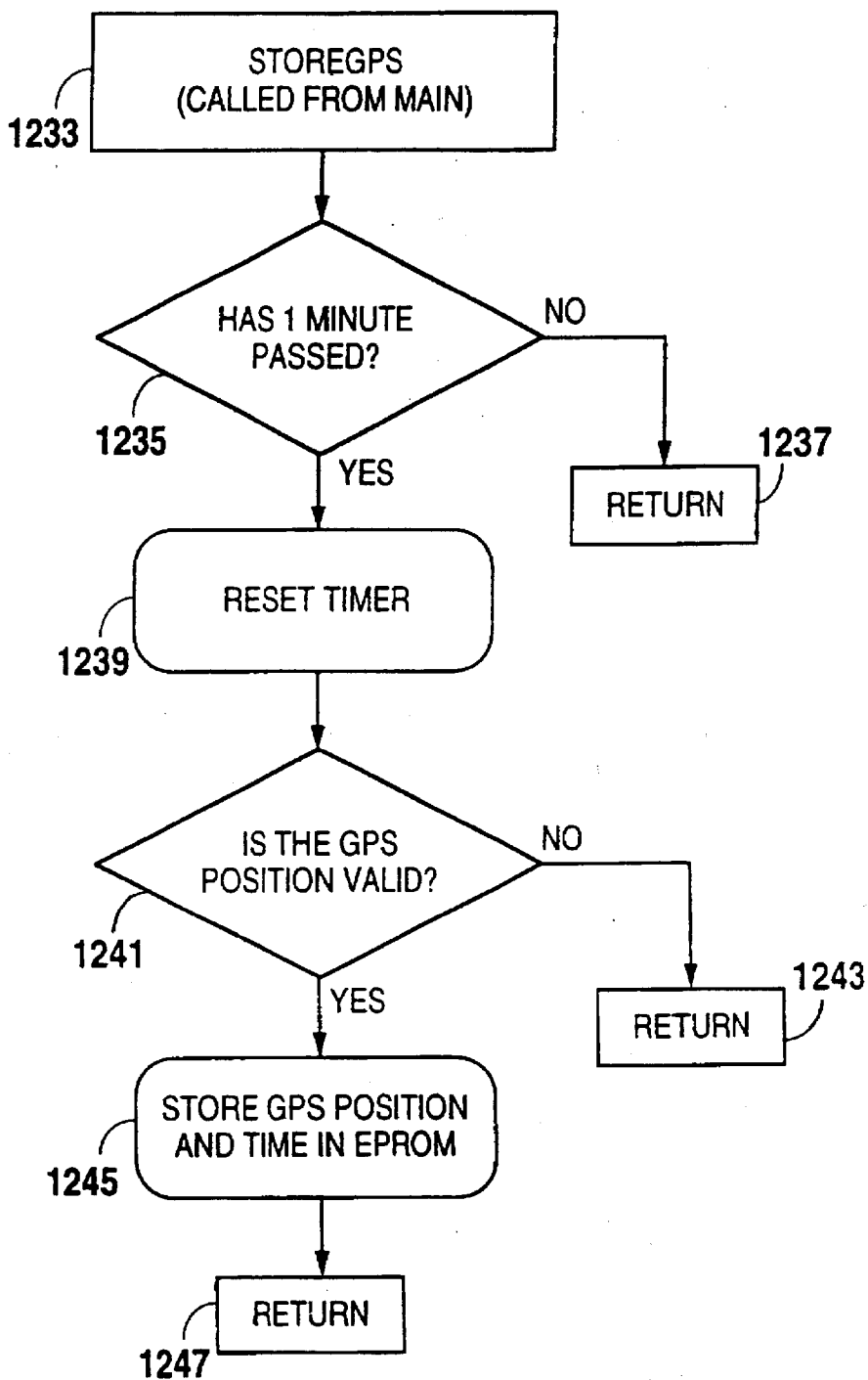
Figure 10I:
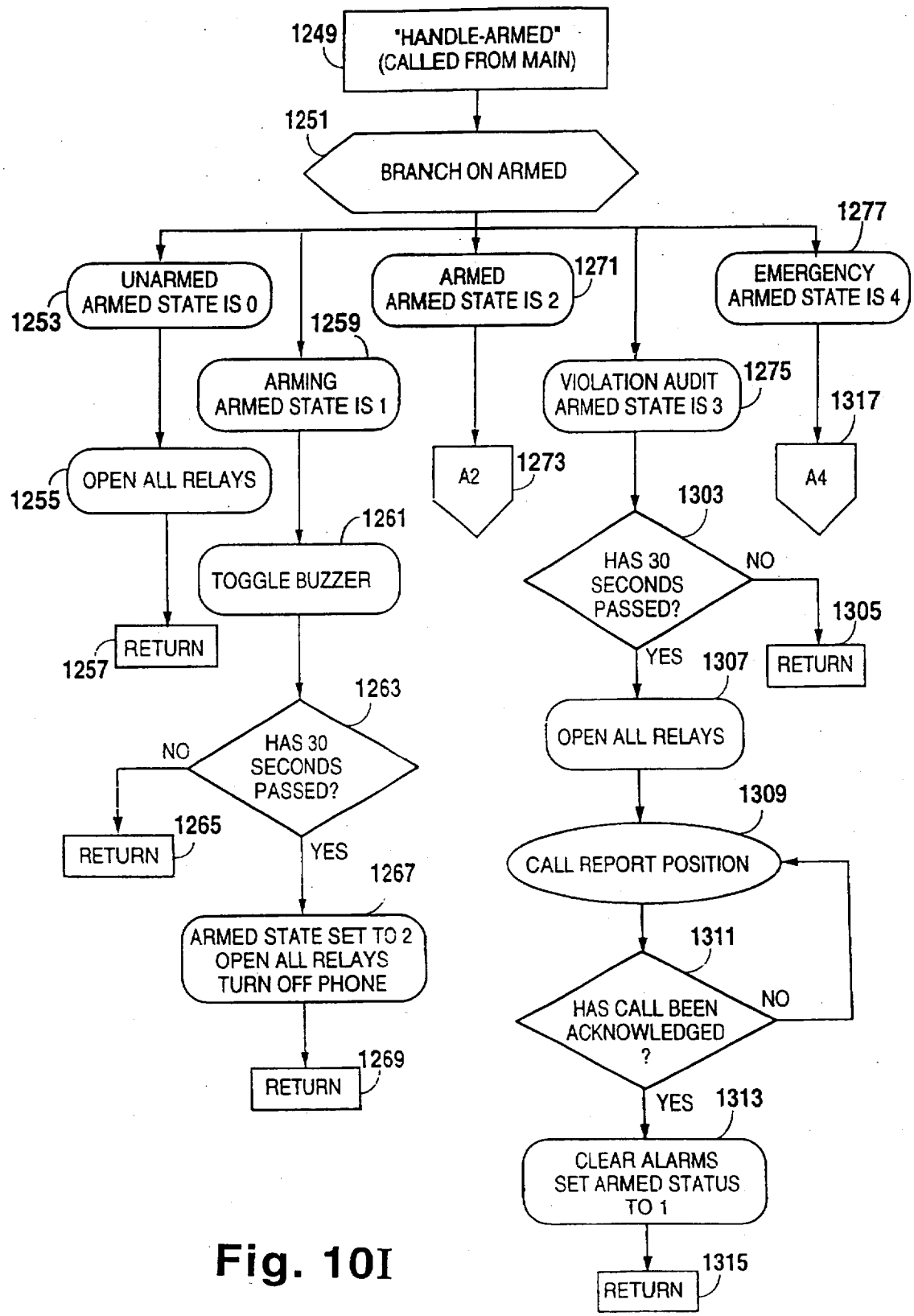
Figure 10J:
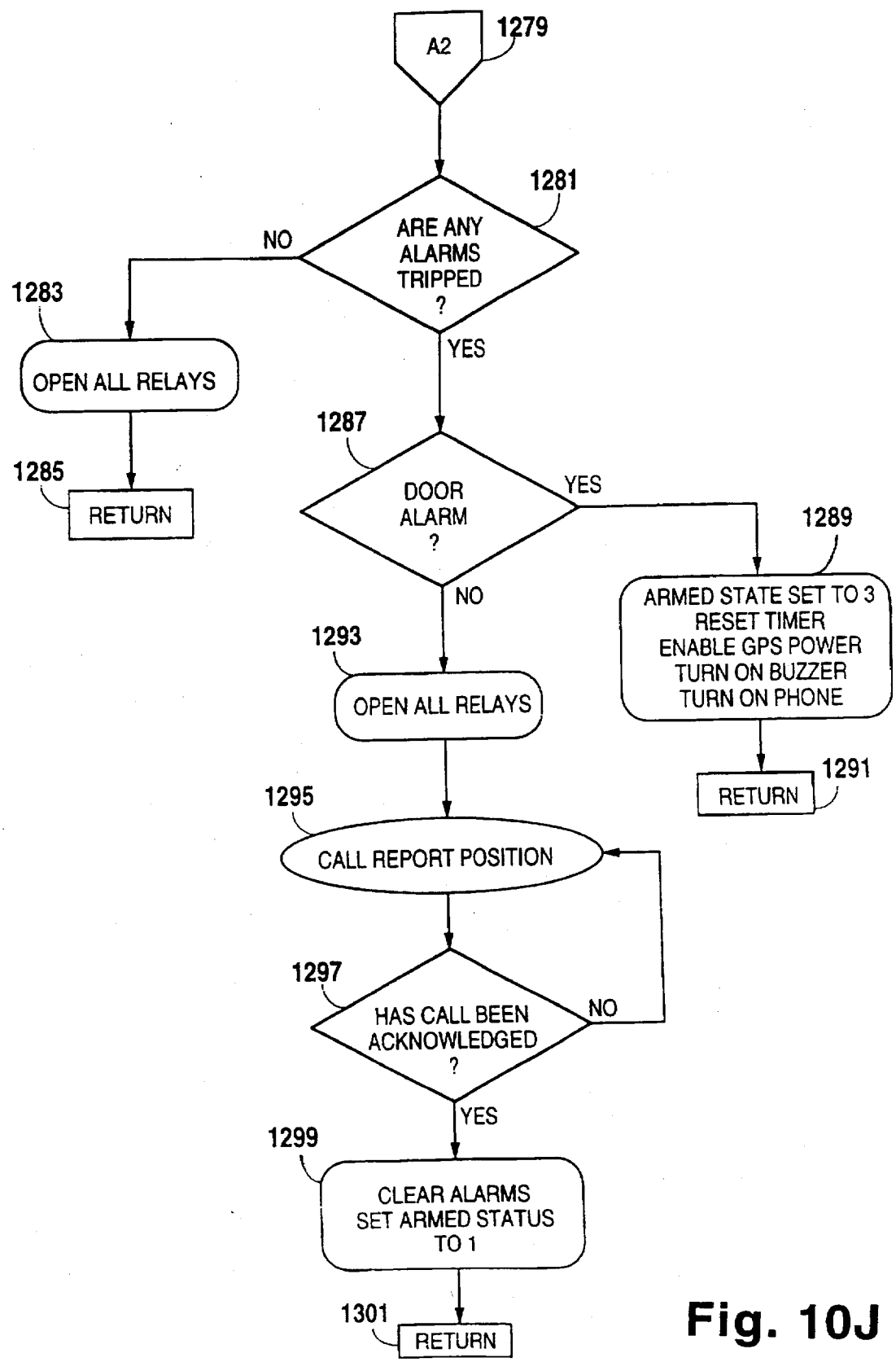
Figure 10K:
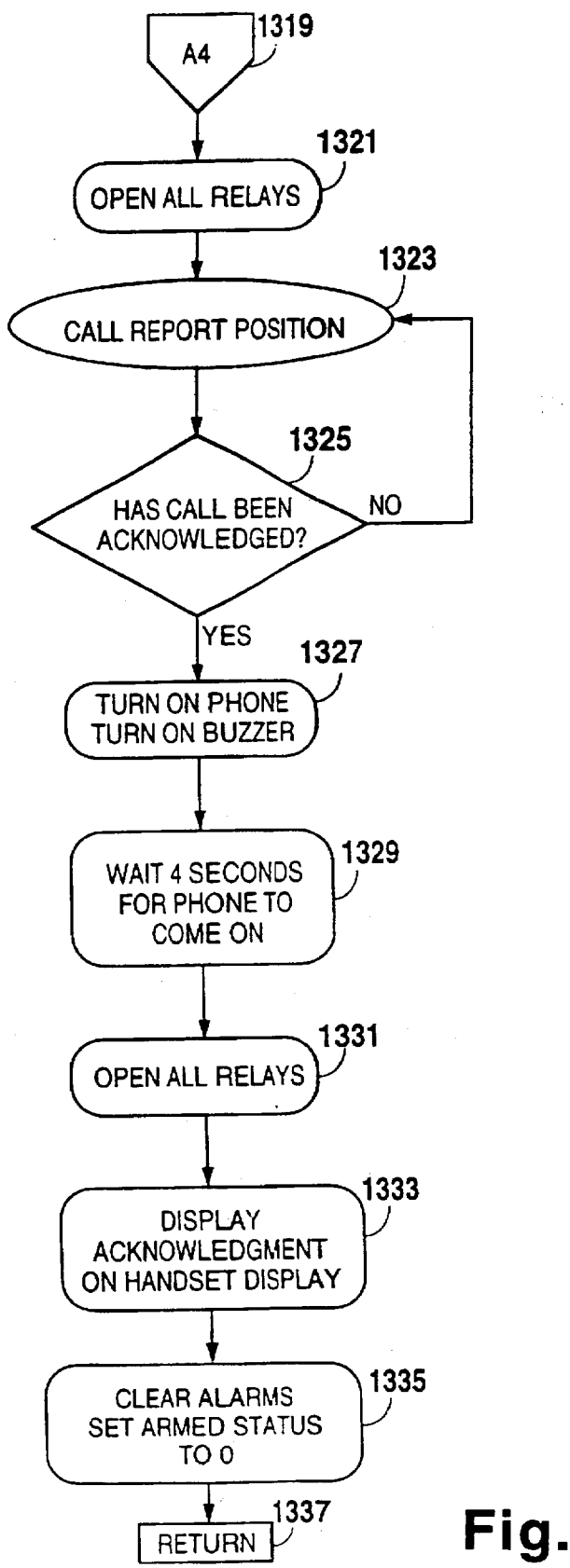
Figure 10L:
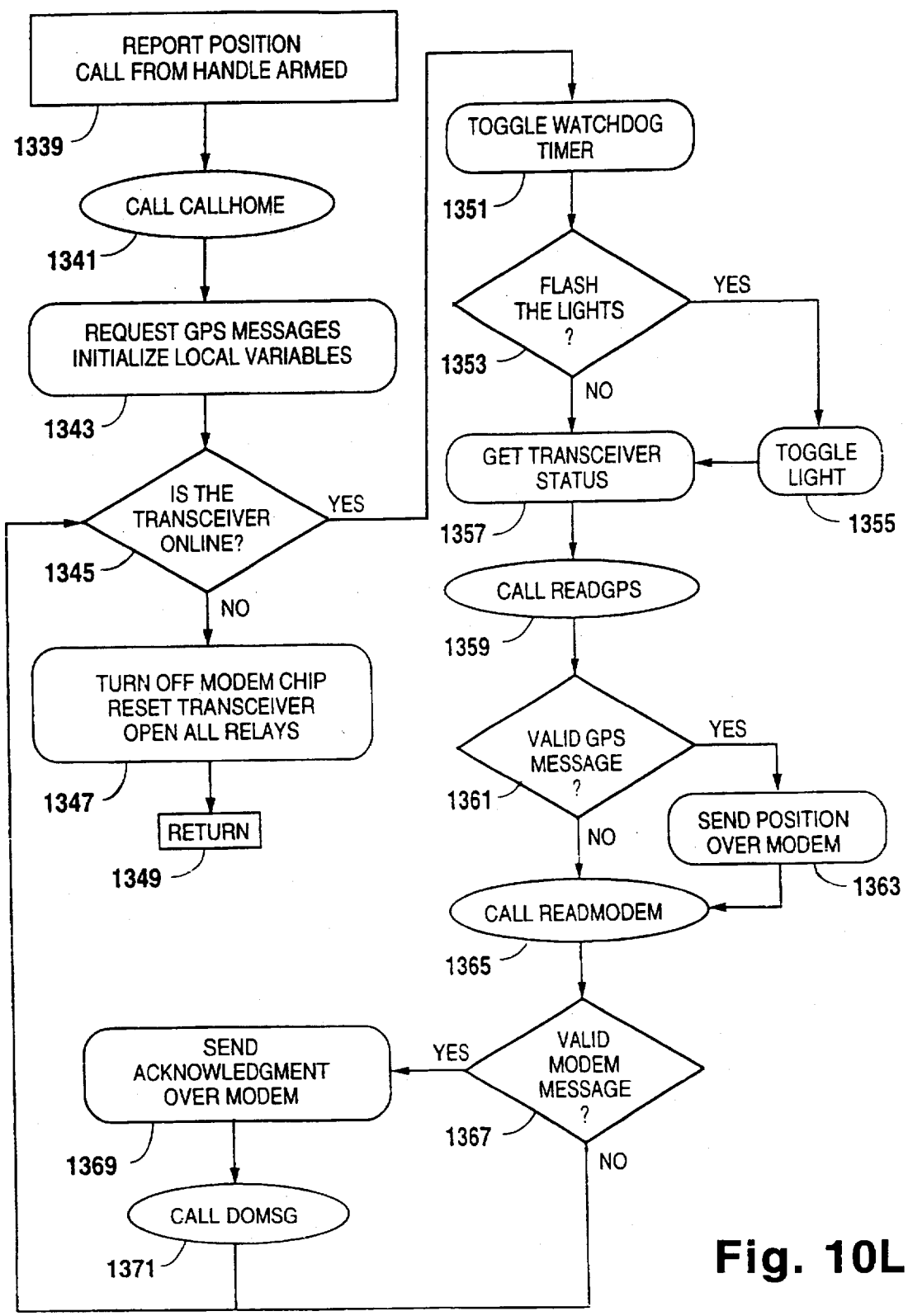
Figure 10M:
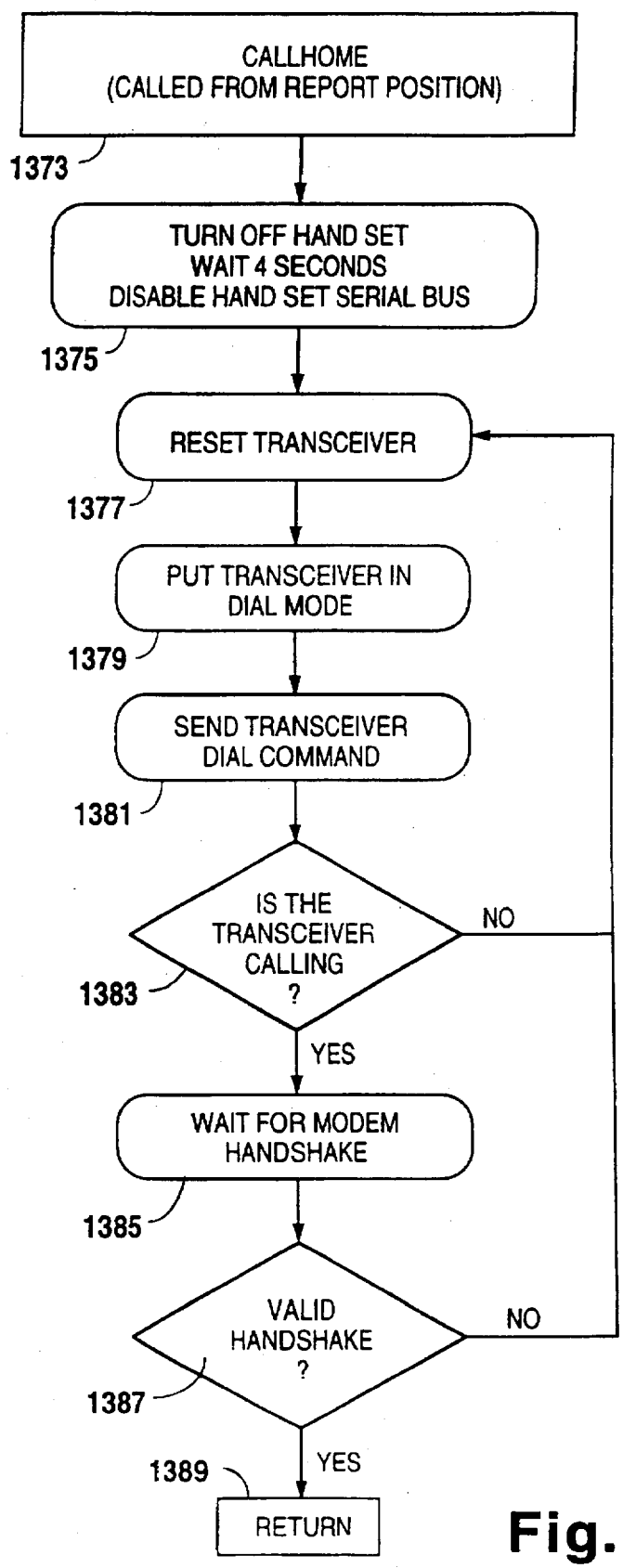
Figure 10N:
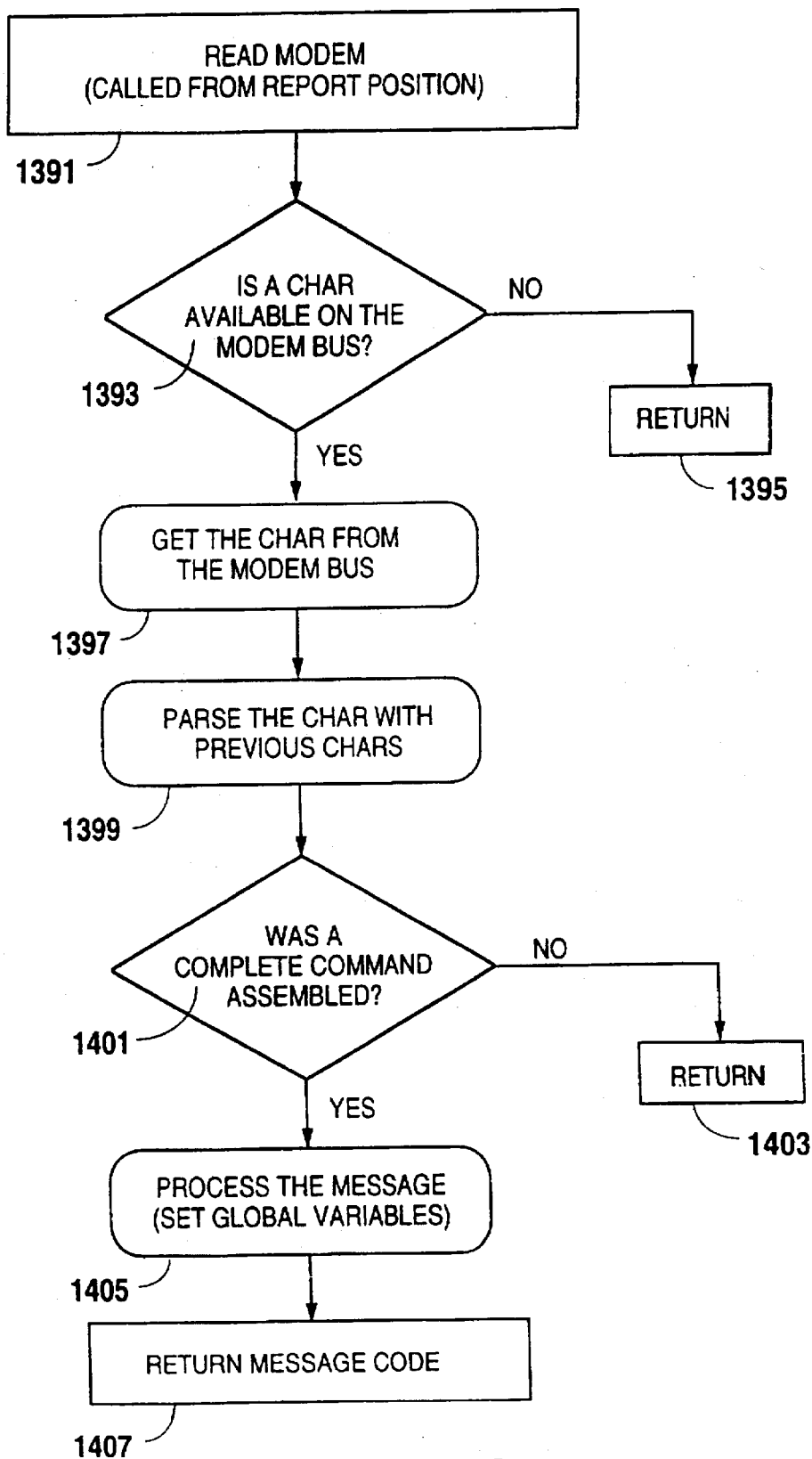
Figure 10O:
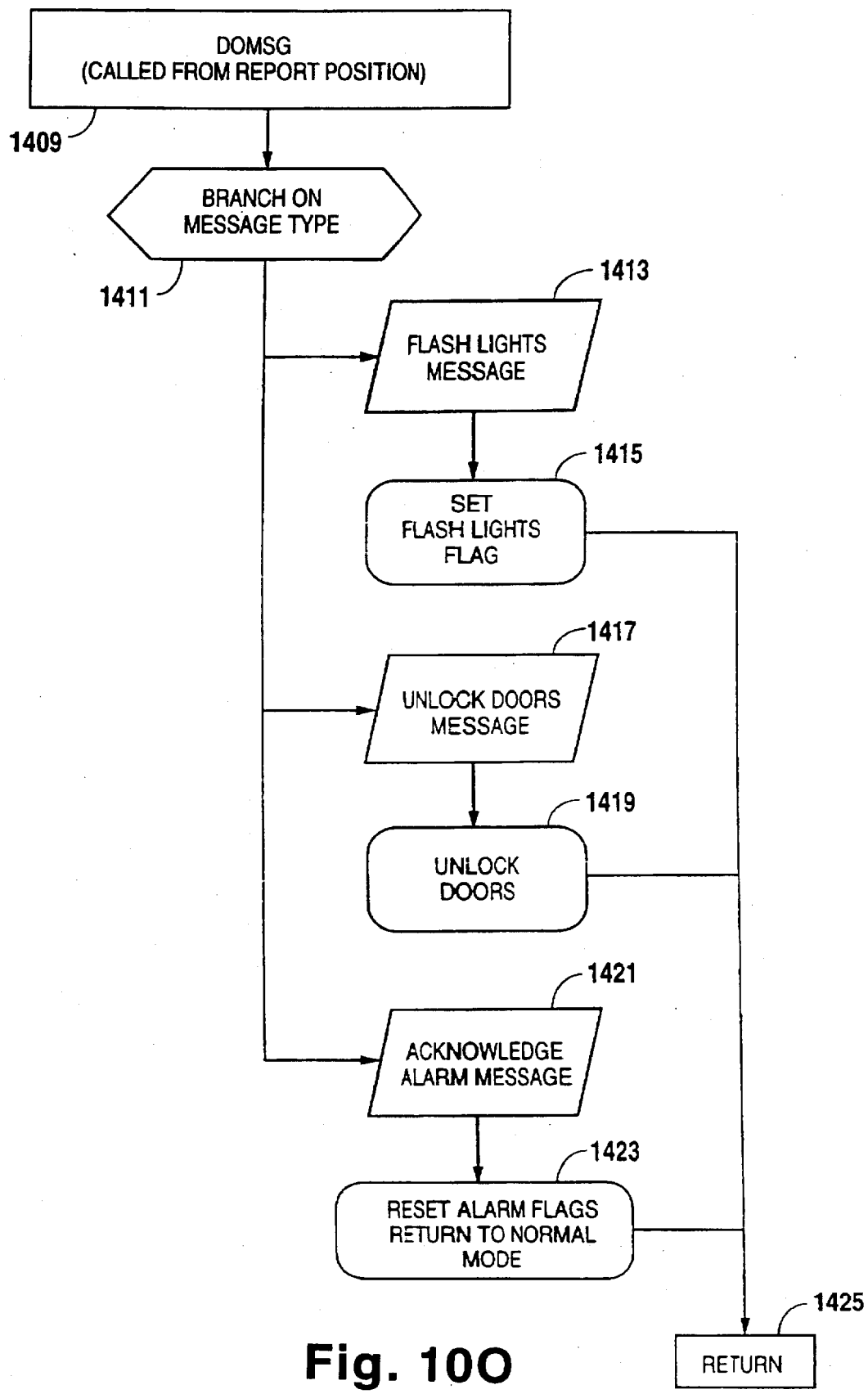

FIG. 10(a) through FIG. 10(o) are flow charts of the operation of the equipment of the vehicle portion of the security system 300 according to the present invention. The software of the security system 300 is described below in the context of the embodiment of the control and communications unit 201, shown in FIG. 4(a). The software is largely identical for the embodiment of the control and communications unit 201', shown in FIG. 5. In the embodiment of the control and communications unit 201' certain portions of the software are stored in the EPROM 521 of the interchangeable module 515 and, are executed by the phone microprocessor 507. Furthermore, the polling of external devices and actual control of relays are executed by micro controllers 503 and 505. Any deviations in the software for the embodiment of the control and communications unit 201' from the described software for the control and communications unit 201 are described below.

The software in the security system 300 is stored in the EPROM 403 and in the RAM 405. The software of the security system 300 controls the alarm system and certain operational functions of the vehicle. Furthermore, the software controls the communication with the central monitoring station 103.

The software of the security system supports unlimited user input through the keypad 211b of the cellular telephone handset 211, acknowledges input and conditions on the handset display 211a, and automatically communicates with the central monitoring station 103 in the event of an intrusion zone violation.

The software of the security system has five internal modes of operation:

UNARMED—When the security system 300 has been placed in the UNARMED state by user input on the handset, it ignores intrusion zone violations. While in the UNARMED state, the security system 300 attempts to meet a set of predetermined conditions which will allow it to automatically enter the ARMED state (e.g., all doors closed and ignition off for more than a preset period of time (e.g., one minute)). The ARMING state can also entered by user input.

ARMING—The ARMING state is a transient state of predetermined duration (e.g., 30 seconds) used to signal the user that the security system 300 is arming itself. The user can abort the ARMING state and return to the UNARMED state by input on the handset. Unless the user aborts the ARMING state the security system 300 enters the ARMED state after the predetermined time period.

ARMED—When the security system 300 is in the ARMED state the security system 300 actively monitors all preset alarm conditions (e.g., violation of any intrusion zone such as doors, windows, or motion detection—such as movement of GPS position) and continuously records the vehicle's position in the RAM 405. When an alarm occurs (except for an intrusion zone violation which leads to the AUDIT state—e.g., the opening of a door), a call is placed to the monitoring station 103 to report the alarm.

AUDIT—Certain intrusion zone violations (e.g., opening of a door) causes the security system 300 to enter into the AUDIT mode. The AUDIT mode permits the user a time window of preset duration (e.g., 30 seconds) to disarm the security system 300. Disarm is accomplished by entering a security code on the keypad 211b. In the alternative embodiment having voice recognition capabilities, the disarming of the security system 300 is accomplished by speaking the security code into the microphone 211c. After the predetermined time period has elapsed a call is placed to the monitoring station 103 to report the intrusion zone violation.

EMERGENCY—At any time (i.e., regardless of which mode the security system 300 is in) an occupant of the vehicle can force the security system 300 into an EMERGENCY calling mode. The EMERGENCY calling mode is entered by entering commands on the keypad 211b of the cellular telephone handset 211. In the EMERGENCY mode, a call is made to the central monitoring station 103 to report the emergency.

The mode in which the security system 300 is operating is stored in a data location named ARMED state in the RAM 405.

The software of the security system 300 provides the following functionality:

Allows user input through the keypad 211b and the microphone 211c of the handset 211.

Acknowledges user input on the handset display 211a.

Supports the five modes of operation described above.

Accepts commands from the monitoring station 103 allowing the monitoring station 103 to control relays controlling operational aspects of the vehicle 200 and allowing the monitoring station to display messages on the display 211a of the cellular telephone handset 211.

Logs the status of the vehicle 200 is the RAM 405 so that lapses in communication with the central monitoring station 103 do not cause the loss of the data.

If there is a break of communication between the vehicle 200 and the central monitoring station 103, the unit continually places calls until a communication link is reestablished.

Supports a voice mode, in which an operator at the central monitoring station 103 can use the cellular telephone system to communicate with the occupant of the vehicle 200 using the handset 211. During the voice mode, the modem communication is shut off and direct communication is established between the handset 211 and the transceiver unit 213.

Automatically arms the security system 300 when user specified conditions are met. The security system 300 supports two alarm triggering modes: "normal" and "carjacking". In normal triggering mode, an alarm situation arises when an intrusion detection device is triggered while the ignition of the vehicle is turned off.

In carjacking mode, an alarm situation occurs when an intrusion detection device is triggered while the ignition is on. If all intrusion protection devices are closed and the ignition is turned off for a preprogrammed period of time, the system 300 automatically arms itself into normal triggering mode. On the other hand, if all intrusion protection devices are closed and the ignition is turned on for a preprogrammed period of time, the system 300 automatically arms itself into carjacking triggering mode.

Triggers an alarm based on GPS position. (e.g., the car has moved outside a specified range).

Sends raw GPS data to a connection for a portable computer.

Supports a remote data link for commands (i.e., arm/disarm). The remote data link allows the central monitoring station 103 to send commands to the vehicle via a paging network.

FIG. 10(a) is a flow chart of the start up procedure for the security system software. The start up procedure is executed when the security system 300 is powered up or when a RESET signal has been detected. RESET is a signal provided to a pin of the CPU 401.

The first step of the start up procedure, step 1001 is to determine whether the start up was requested as a normal power up or due to a trap condition. Trap conditions are due to some form of error occurrence.

If a trap condition has been detected, decision box 1003, the relays are slowly cycled and the CPU 401 is HALTed and RESET, step 1005. Cycling of the relays, which causes the flashing of lights, etc., is indicative of a problem in the security system 300; other problem indicators may be used. If a normal start has occurred (e.g., not a trap, decision box 1003), step 1007 is executed. In step 1007, Wait states are set, the CPU's 401 stack pointer is set, RAM refresh is disabled, and DMA (direct memory access) requests are disabled. The substeps of step 1007 are executed to initialize the processor so that the SETUP procedure may execute.

After step 1007 a call is made to the SETUP procedure, step 1009. The SETUP procedure is described below in conjunction with FIG. 10(b).

After the SETUP procedure has been executed, step 1011 is executed. Step 1011 contains the substeps of setting up Bank switching, clearing the RAM 405, initializing the RAM 405 from contents of the EPROM 403, and setting up a "C" Memory Allocator.

Following step 1011 the main program is invoked, step 1013. The main program is discussed below in conjunction with FIG. 10(c).

FIG. 10(b) is a flow chart showing the operation of the SETUP procedure. The SETUP procedure is invoked from the START up procedure (FIG. 10(a)). The first step 1017 of the SETUP procedure is to initialize the CPU 401 and to initialize any support chips, e.g., the modem 407. Next the RAM 405 is tested, decision box 1019. If the RAM 405 is determined to be faulty, an error condition is entered, e.g., the relays are constantly cycled, step 1021. If the test indicates that the RAM 405 is not faulty, the SETUP procedure is completed and control is returned to the calling program, step 1023.

FIG. 10(c) is a flowchart showing the operation of the MAIN program of the security system software. The entry point to the main program 1025 is called from the START up program. Steps 1027 through 1039 are initialization steps and steps 1041 through 1053 represent an infinite loop 1055. The first step of the initialization is step 1027, toggling the watchdog timer 419. Next all relays are opened, thereby disabling the devices connected to the relays, and the cellular telephone handset 211 is disabled, step 1029. Next a one second wait state is entered, step 1031, and the watchdog timer is again toggled, step 1033. Step 1033 is followed by a step in which various communications are enabled, step 1035. Both data and audio communication between the handset keypad 211b and the cellular telephone transceiver 213 are enabled.

Next, the GETNAM procedure is called, 1037, to obtain the NAM and the serial number of the cellular telephone. The final step of the initialization is to initialize all global variables, step 1039, e.g., the ARMED global variable is initialized to 0, i.e., the "UNARMED" state.

Following the initialization, the main program enters an infinite loop, 1055. The first step of the loop 1055 is to again ensure that the handset keypad 211 is connected to the transceiver unit 213, step 1041. Next, the watchdog timer 419 is toggled, step 1043, followed by a call to the READCHARS procedure (described below in conjunction with FIG. 10(e)) to obtain a code number from the handset keypad 211b. The code number corresponds to any commands that have been entered on the handset keypad 211b. A code return of 0 signifies that no complete code had been entered, a code of 1 means that the ARM command had been entered, a code of 2 means that the UNARM command had been entered, and any other code (3 through 8) means that an EMERGENCY command had been entered.

In the alternative embodiment for voice recognition of spoken commands, a procedure called VOICEMSG is called to poll the voice recognition circuitry to determine whether a command to the security system has been spoken through the handset microphone 211b. During normal communications mode a direct link between the handset 211 and the transceiver unit 213 is established through the switching network 417. The voice recognition circuitry, e.g., the analog-to-digital converter 415 and the DSP 421, is tapped into the audio lines of this connection. The DSP 421 (or in the embodiment not having a DSP, the CPU 401) is programmed to recognize certain verbally spoken commands. When a command has been recognized, it is saved in a queue in the RAM 405. When the VOICEMSG procedure polls the voice recognition circuitry for a verbally spoken command, if one or more exists in the queue, the code from the front of the queue is returned, otherwise a NULL command is returned from the VOICEMSG procedure.

Next, the SETMODE procedure is called, step 1047 (the SETMODE procedure is discussed below in conjunction with FIG. 10(f)). The SETMODE procedure sets the mode of the security system based on the code returned by the READCHARS command in step 1045.

Next, the position of the vehicle is determined by calling the READGPS procedure, step 1049, followed by a call to the STOREGPS procedure, step 1051, for storing the position into the EPROM 403. The READGPS procedure and the STOREGPS procedure are discussed below in conjunction with FIGS. 10(g) and 10(h), respectively.

The final step of the infinite loop 1055, step 1053, is a call to the HANDLE-ARMED procedure which, among other things, takes actions depending on the ARMED state and any events, such as protection zone invasion. Following the return from the HANDLE-ARMED procedure, the loop repeats at step 1041.

FIG. 10(d) is a flowchart showing the operation of the GETNAM procedure. The NAM of a cellular telephone is a data structure which includes, but is not limited to, the serial number of the telephone, the password of the telephone, a system identification number. The NAM is stored in the handset 211.

The entry point to the GETNAM procedure, box 1057, is called from the main program in step 1037. The first step of the GETNAM procedure is to poll the handset 211 for the NAM information, step 1059. Next, the handset 211 is polled for the handset serial number, step 1061. Finally, control is returned to the calling procedure, step 1063.

In the embodiment of the control and communications unit 201' shown in FIG. 5, the polling of the handset is executed by the telephone micro controller 507, and the call to the GETNAM procedure from the CPU 401' causes the request for the NAM and the serial number to be placed on the micro controller bus 501.

FIG. 10(e) is a flowchart showing the operation of the READCHARS procedure. The entry point to the READCHARS procedure, box 1065, is called from the main program at step 1045. The READCHARS procedure operates on the principle of adding new characters to a string of already entered characters. When a new character is added the string is parsed to determine whether a complete command has been entered, and when a complete command has been entered its number is returned.

The first step of the READCHARS procedure is to determine if a new character has been entered on the serial bus connecting the handset 211 and the transceiver unit 213, step 1067. If no new character has been entered, the procedure returns to the calling program, step 1069. If a character has been entered, the character is obtained from the serial bus and amended to the string of previously entered characters, step 1071. The next step is to parse the string, step 1073.

If a complete command has not yet been assembled, as determined by decision box 1075, the procedure returns to the calling program, step 1077. However, if a complete command has been assembled, it is determined if that command is an "UPDATE DISPLAY" command, decision box 1079. If it was not an "UPDATE DISPLAY" command, control is returned to the calling procedure, step 1081. Otherwise, it is determined if the command was a system command, step 1083. If the command was not a system command, then control is returned directly to the calling procedure, step 1085; otherwise, the code number of the command is returned to the calling procedure, step 1087.

In the embodiment of the control and communications unit 201', the READCHARS procedure call executed on the CPU 401' causes a request for the telephone micro controller 507 to be placed onto the bus 501. The telephone micro controller 507 continuously monitors the communication between the handset 211 and the transceiver unit 213. Any characters entered onto the serial connection between the handset 211 and the transceiver unit 213 are placed in a queue. The request for a character from the CPU 401' either causes the telephone micro controller 507 to place the character at the front of the queue onto the micro controller bus 501, or, if the queue is empty, causes the telephone micro controller 507 to place a NULL character onto the micro controller bus 501.

FIG. 10(f) is a flowchart showing the operation of the SETMODE procedure. The entry point of the SETMODE procedure, box 1089, is called from the MAIN program at step 1047. The SETMODE procedure branches to a sequence of steps which correspond to the display code returned from the READCHARS procedure, branch selector box 1091. If a display code of 0 was returned, branch 1093, which corresponds to a "NO CODE" entered condition, then the procedure returns directly to the MAIN program, step 1095.

If a display code of 1 was returned from the READCHARS procedure, which corresponds to an "ARM"

command, then step 1099 is executed. Step 1099 includes the substeps of turning on the buzzer 255, display the text "ARMED" on the handset display 211a, reset the global variable TIMER, and set the global variable ARMED to 1. Then, control is returned to the main program, step 1201.

If a display code of 2 was returned from the READ-CHARS procedure, which corresponds to an UNARM command, branch 1203 is selected, the first step of which is step 1205. Step 1205 includes the substeps of clearing all relays, displaying the text "UNARMED" on the display 211a, and setting the state of the ARMED global variable to 0. Control is returned to the main program, step 1207.

If a display code of 3 through 8, which corresponds to the EMERGENCY command, was returned from the READ-CHARS procedure, branch 1209 is selected. The first step of branch 1209 is step 1211, which includes the subcommands of displaying an acknowledgment on the display 211a, setting the state of the ARMED global variable to 4, and setting the ALARM global variable to the Emergency code, following which control is returned to the calling program.

FIG. 10(g) is a flowchart showing the operation of the READGPS procedure. The entry point of the READGPS procedure, box 1215, is called from the main program in step 1049. The READGPS procedure adds new characters from the bus connecting the GPS receiver 219 with the CPU 401 to a string and determines if that string represents a complete GPS command. The first step is to determine if a character is available of the GPS bus, step 1217. If there is no character available on the GPS bus, the READGPS procedure returns to the main program, step 1219.

If a character is available, that character is obtained from the GPS bus, step 1221, and is concatenated with the previously obtained characters. Then, the resulting string is parsed, step 1223, and it is determined whether the string represents a complete GPS command, step 1225. If a complete command has not been assembled in the string, control is returned to the main program, step 1227. However, if a complete command has been assembled, the command is processed and global variables relating to the GPS information are set, e.g., longitude and latitude, step 1229. Finally, a message code is returned, step 1231, e.g., the latitude, longitude, altitude, and GPS status (whether or not a valid position has been received from the GPS).

FIG. 10(h) is a flowchart showing the operation of the STOREGPS procedure. The entry point of the STOREGPS procedure, box 1233, is called from the main program, at step 1051. The STOREGPS procedure stores a valid GPS Position once a minute. Thus, the first step is to determine if a minute has passed since the last time a GPS position was stored, decision box 1235. If a minute has not yet passed, control is returned to the main program, step 1237. If a minute has passed, first, the TIMER is reset, step 1239, then, it is determined if the GPS position is valid, step 1241. This determination is based on the GPS status returned from the READGPS procedure. If the GPS position is not valid, control is returned to the main program, step 1243. Otherwise, the GPS position and the current time are stored in the EPROM 403, step 1245. Finally, control is returned to the calling program, step 1247.

FIG. 10(i) through FIG. 10(k) are flowcharts showing the operation of the HANDLE-ARMED procedure. The entry point of the HANDLE-ARMED procedure, box 1249, is called from the main program at step 1053. The HANDLE-ARMED procedure has one branch for each mode of operation of the security system 300. Thus, there is a branch for UNARMED, one for ARMING, one for ARMED, one for VIOLATION AUDIT, and one for EMERGENCY. The first step is to select a branch depending on the value of the global variable ARMED, step 1251. If ARMED has the value 0, corresponding to the UNARMED mode, the branch beginning with step 1253 is selected; if ARMED has the value 1, corresponding to the ARMING mode, the branch beginning with step 1259 is selected; if ARMED has the value 2, corresponding to the mode ARMED, the branch beginning with step 1271 is selected; if ARMED has the value 3, corresponding to the mode VIOLATION AUDIT, the branch beginning with step 1275 is selected; and if ARMED has the value 4, corresponding to the EMERGENCY mode, the branch beginning with the step 1277 is selected.

The UNARMED branch has an entry point at step 1253. The first step of the UNARMED branch is to open all relays, step 1255, followed by returning control to the main program, step 1257.

The ARMING branch has its entry point at step 1259, followed by the step of toggling a global variable named BUZZER. The BUZZER global variable is used to control whether the buzzer 255 is sounded or not. The next step is to determine whether the preset time for ARMING mode (e.g., 30 seconds) has passed, decision box 1263. In the SETMODE procedure, at step 1099, the TIMER global variable is reset. The current time is compared to the contents of the TIMER global variable to determine the amount of elapsed time since the ARMING mode was entered. If less than the preset time period has elapsed, control is returned to the main program, step 1265. Otherwise, the ARMED global variable is set to 2, thereby changing the mode from ARMING (state 1) to ARMED (state 2), all relays are opened, and the cellular telephone is turned off, step 1267. The ARMING branch ends by returning control to the main program, step 1269.

The ARMED branch has its entry point at step 1271. The body of the ARMED branch is shown in the flow chart of FIG. 10(j), following box 1279. The first step, step 1281, is to determine if any intrusion zones have been violated. If no intrusion zones have been violated, all relays are opened, step 1283, which is followed by a return of control to the main program, step 1285.

If it is determined that an intrusion zone has been violated, it is next determined whether that intrusion zone is a type of violation which would lead the system to enter into the AUDIT mode, step 1287. An example of such a violation is the opening of a door (The security system 300 may be programmed so that the triggering of any intrusion detection device causes the security system 300 to enter into to AUDIT mode). If it is determined that AUDIT mode should be entered, step 1289 is executed. Step 1289 includes the substeps of setting the ARMED global variable to 3, the state equivalent to AUDIT mode, resetting the TIMER global variable, enabling power to the GPS receiver 219, turning on the BUZZER and turning of the cellular telephone transceiver. Next, control is returned to the main program, step 1291.

If it is determined that the violation was not the type of violation which should lead the system to enter AUDIT mode, e.g., the GPS position has changed, then, first, all relays are opened, step 1293. Next, a call is made to the REPORT-POSITION procedure, step 1295. REPORT-POSITION is described in conjunction with FIG. 10(l). REPORT-POSITION is called to establish contact with the central monitoring station 103, to report the vehicle's position to the central monitoring station 103, and to accept and process any commands sent from the central monitoring station 103 to the vehicle 200. The call to the REPORT-POSITION procedure is repeated until the call has been acknowledged by the central monitoring station 103, step 1297. When the call REPORT-POSITION procedure returns with a call acknowledged status, the alarms are cleared, and the ARMED global variable is set to 1, the ARMING mode, step 1299. Finally, the ARMED branch returns control to the main program, step 1301.

The VIOLATION AUDIT branch commences at entry point 1275. The VIOLATION AUDIT branch is invoked when a particular kind of invasion zone violation has occurred, e.g., the opening of a door. During the VIOLATION AUDIT mode, the occupant of the vehicle is given a predetermined amount of time to disarm the system. Failure to disarm the system within that period of time triggers a call to the central monitoring station 103.

The first step of the VIOLATION AUDIT branch is to determine whether more time than the allowed time for disarming has elapsed, step 1303. If less than the allowed time has elapsed, control is returned to the main program, step 1305.

If the allowed time has expired, first, all relays are opened, step 1307. Next, a call is made to the REPORT-POSITION procedure, step 1309. REPORT-POSITION is described in conjunction with FIG. 10(*l*). REPORT-POSITION is called to establish contact with the central monitoring station 103, to report the vehicle's position to the central monitoring station 103, and to accept and process any commands sent from the central monitoring station 103 to the vehicle 200. The call to the REPORT-POSITION procedure is repeated until the call has been acknowledged by the central monitoring station 103, step 1311. When the call REPORT-POSITION procedure returns with a call acknowledged status, the alarms are cleared, and the ARMED global variable is set to 1, the ARMING mode, step 1313. Finally, the VIOLATION AUDIT branch returns control to the main program, step 1301.

The EMERGENCY branch commences with the entry point 1277. The body of the EMERGENCY branch is shown in the flow chart of FIG. 10(*k*) following box 1319.

The first step of the EMERGENCY branch is to open all relays, step 1321. Next a call is made to the REPORT-POSITION procedure, step 1323. This call is repeated until the central monitoring station 103 acknowledges the call, step 1325.

Next, the cellular telephone transceiver 213 and the BUZZER are turned on, step 1327. Step 1327 is followed by a wait state period for waiting for the telephone to come on, step 1329. After the wait period 1327 all relays are opened, step 1331. Next, an acknowledgment is displayed on the handset display 211*a*, step 1333. Next, all alarms are cleared and the ARMED global variable is set to 0, corresponding to the UNARMED mode, step 1335. Finally, control is returned to the main program, step 1337.

FIG. 10(*l*) is a flowchart showing the operation of the REPORT-POSITION procedure. The entry point 1339 to the REPORT-POSITION procedure is called from the HANDLE-ARMED procedure at steps 1309, 1295, and 1323. The first step of the REPORT-POSITION procedure is to call the CALLHOME procedure, step 1341, to establish modem communication with the central monitoring station 103. The CALLHOME procedure is described below in conjunction with FIG. 10(*m*).

The next step is to request the GPS position information stored by the STOREGPS procedure and to initialize all local variables, step 1343.

Step 1343 is followed the step of determining whether the cellular telephone transceiver 213 is on-line, step 1345. If the transceiver 213 is not on-line, the modem 407 is turned off, the transceiver 213 is reset, and all relays are opened, step 1347, and control is returned to the calling procedure, step 1349.

If the transceiver is on-line, as determined in step 1345, the watchdog timer is toggled, step 1351. Next, if the system has been programmed to flash the headlights 127 through 127''', which is determined in decision box 1353, then the lights are toggled, step 1355.

Next the transceiver 213 status is obtained, step 1357. If a transceiver status is returned indicating that there is no cellular telephone service, that is an indication that there may be a problem with the cellular antenna 215. Therefore, upon receiving a "no service" status, the CPU 401, via one of the relay drivers, sends a signal to the antenna relay 216 to switch to the backup cellular antenna 217.

Step 1357 is followed by calling the READGPS procedure, 1359, to obtain the current position of the vehicle, step 1359. If a complete and valid GPS message was returned from the READGPS procedure, decision box 1361, then the position is sent via the modem 407 to the central monitoring station 103, step 1363.

Next a call is made to the READMODEM procedure, step 1365, to determine if the central monitoring station has communicated any messages, step 1365. If no message has been received on the modem 407, control is transferred back to step 1345. Otherwise, an acknowledgment is sent over the modem 407, step 1369, and a call is made to the DOMSG procedure, step 1371, to carry out any commands sent by the central monitoring station.

FIG. 10(*m*) is a flowchart showing the operation of the CALLHOME procedure. The entry point of the CALLHOME procedure, step 1373, is called from the REPORT-POSITION procedure at step 1341. The first step of the CALLHOME procedure is turn off the cellular telephone handset 211, pause for four seconds, and disable the serial bus connecting the handset 211 to the transceiver unit 213, step 1375.

Next, the cellular telephone transceiver 213 is reset, step 1377, which is followed by placing the transceiver 213 in DIAL mode, step 1379. Next, the dial command is sent to the transceiver 213, step 1381, and the determination is made as to whether the transceiver 213 is placing the call, decision box 1383. If the transceiver 213 is not placing the call, control is transferred back to step 1377 and the process of trying to place the call is repeated.

If the transceiver is making the call, as determined in decision box 1383, the software waits for the modem handshake to complete 1385. When the handshake has completed, it is determined whether a valid handshake was achieved, decision box 1387. If a valid handshake has not been achieved, control is transferred back to step 1377, and the calling process is repeated. Otherwise, control is returned to the calling program, step 1389.

FIG. 10(*n*) is a flowchart showing the operation of the READMODEM procedure. The entry point of the READMODEM procedure, box 1391, is called from the REPORT-POSITOIN procedure at step 1365. The READMODEM procedure assembles a command string by appending a character obtained from the modem 407 to a string of previously obtained characters.

The first step of the READMODEM procedure is to determine if there is a character available from the modem 407, decision box 1393. If no character is available, the procedure returns to calling procedure, step 1395.

If the character is available, it is obtained from the modem 407, appended to the previously received characters, step 1397. The resulting string is then parsed, step 1399. If the resulting string is not a complete command, decision box 1401, then the procedure returns control to the calling procedure 1403. Otherwise, global variables corresponding to the message are set, step 1405. Global variables associated with the modem 407 include message id, which is the code corresponding to the requested command. Finally, the message code is returned to the calling program, step 1407.

FIG. 10(o) is a flowchart showing the operation of the DOMSG procedure. The entry point of the DOMSG procedure, box 1215, is called from the REPORT-POSITION procedure at step 1371. The DOMSG procedure has a branch for each valid command. The first step of the DOMSG procedure is to branch to the branch corresponding to the particular command being processed, step 1411.

The first branch show is the branch corresponding to the "Flash lights" message, branch 1413. The first step of the FLASH LIGHTS branch is to set the Flash Lights flag global variable, step 1415, after which control is returned to the calling program, step 1425.

The second branch is the branch corresponding to the "Unlock Doors" message, 1417. In this branch the doors are unlocked, step 1419.

The third branch corresponds to an acknowledgment from the central monitoring station that an alarm condition has been received, step 1421. This branch contains the steps of resetting the alarm flags and returning to normal communication mode, step 1423. Finally, control is returned to the main program, step 1425.

The DOMSG procedure includes branches for any valid command from the central monitoring station 103. The flow chart of FIG. 10(o) is exemplary in nature. A person skilled in the art will realize many additional commands, some of which have been described above, e.g., shutting of the ignition, and sounding the horn.

Figure 11A:
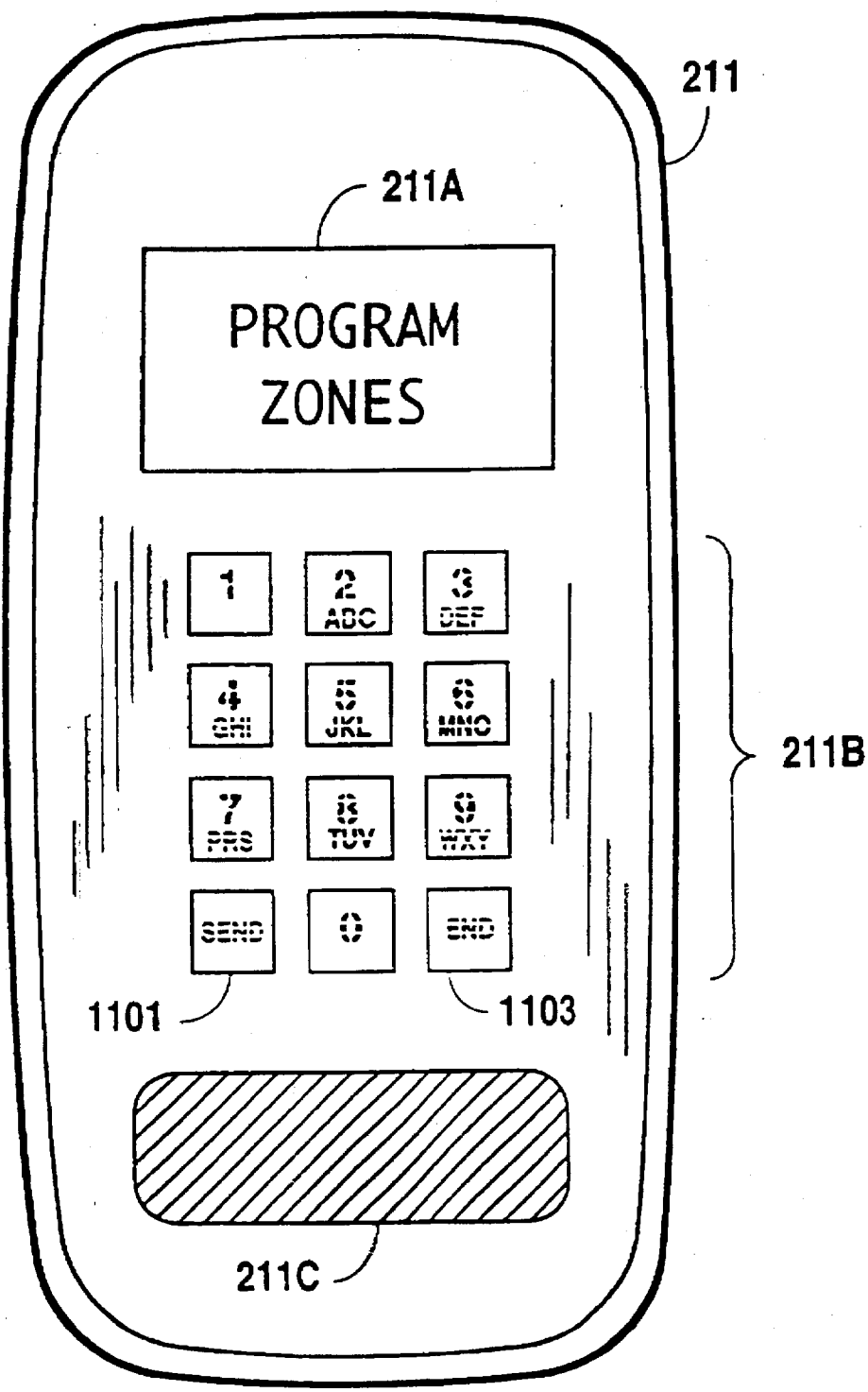
FIGS. 11(a) through 11(c) illustrate a handset of the security system during programming mode.

The EPROM 521 is programmable to store several features of a particular security system 300. The following is a list of programmable features:

For each protection zone:
  whether the zone is active or inactive
  whether a violation of the protection zone causes a transition to audit mode or alarm mode
  for an audit zone, the length of the audit time
  whether a violation of the protection zone causes a call to the central monitoring station
  whether a violation of the protection zone causes the sounding of a siren
any of the codes for commands, e.g.:
  the code for arming the system
  the code for disarming the system
  the panic code
  the code for requesting dispatch of police, wrecker, ambulance etc.
whether the system automatically enters ARMED normal triggering mode
whether the system automatically enters ARMED carjacking triggering mode
a position range, e.g., a GPS coordinate range, for which an excursion by the vehicle beyond the range would cause an alarm condition
disable/enable of the limited range feature
the length of time which the siren is sounded at any time These features are programmed through a menuing feature of the handset 211. FIG. 11 illustrates the handset 211 during programming mode. During programming mode, which is entered by entering a code on the keypad 211b, several levels of menus are displayed on the display 211a. In FIG. 11(a) programming mode has been entered and the text "PROGRAM ZONES" appears on the display 211a.

At any level pressing the SEND key 1101 causes a transition to the next lower level menu, pressing the END key 1103 causes a transition to the next higher level menu, and pressing any other key causes a transition to the next menu item at the given level. Pressing the END key 1103 at the highest level causes an exit from the programming mode. Pressing any key, other than the SEND key 1101 or the END key from the last menu item in a given level causes a transition to the first menu item at the same level.

The highest level menu contains menu items "ZONES", "CODES", "ARM TIMES", "GPS RANGE", and "SIREN". Pressing the SEND key at the "ZONES" menu enters a list of the protection zones. For each protection zone, if the SEND key 1101 is pressed, the programmable features are displayed as menu items, e.g., active/inactive, audit/alarm, audit time, call/don't call, and siren/no siren. For items which have two alternatives (e.g., active/inactive), the current setting is displayed and pressing the SEND key 1101 causes the item to toggle to the alternative setting. For items which require a numerical input (e.g., audit time) the numerical keys are used to enter the numerical value for the feature, and the SEND key 1101 causes a transition to the next menu item.

Figure 11B:
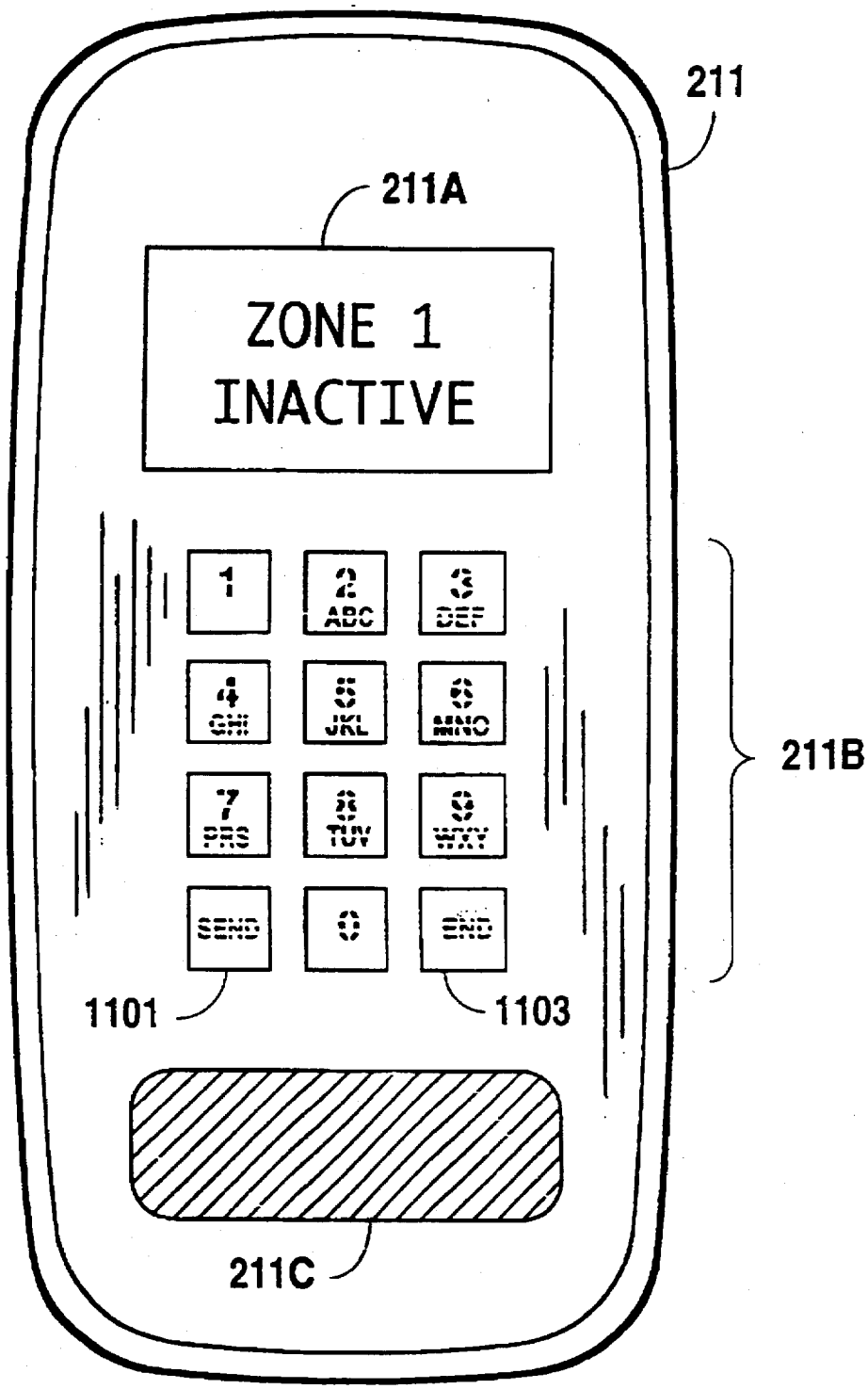

FIG. 11(b) shows the handset 211 in the menu for a first protection zone. A message of "ZONE 1 INACTIVE" is displayed on the display 211a. If the user presses the SEND key 1101, the zone 1 would be activated and "ZONE 1 ACTIVE" would be displayed.

Figure 11C:
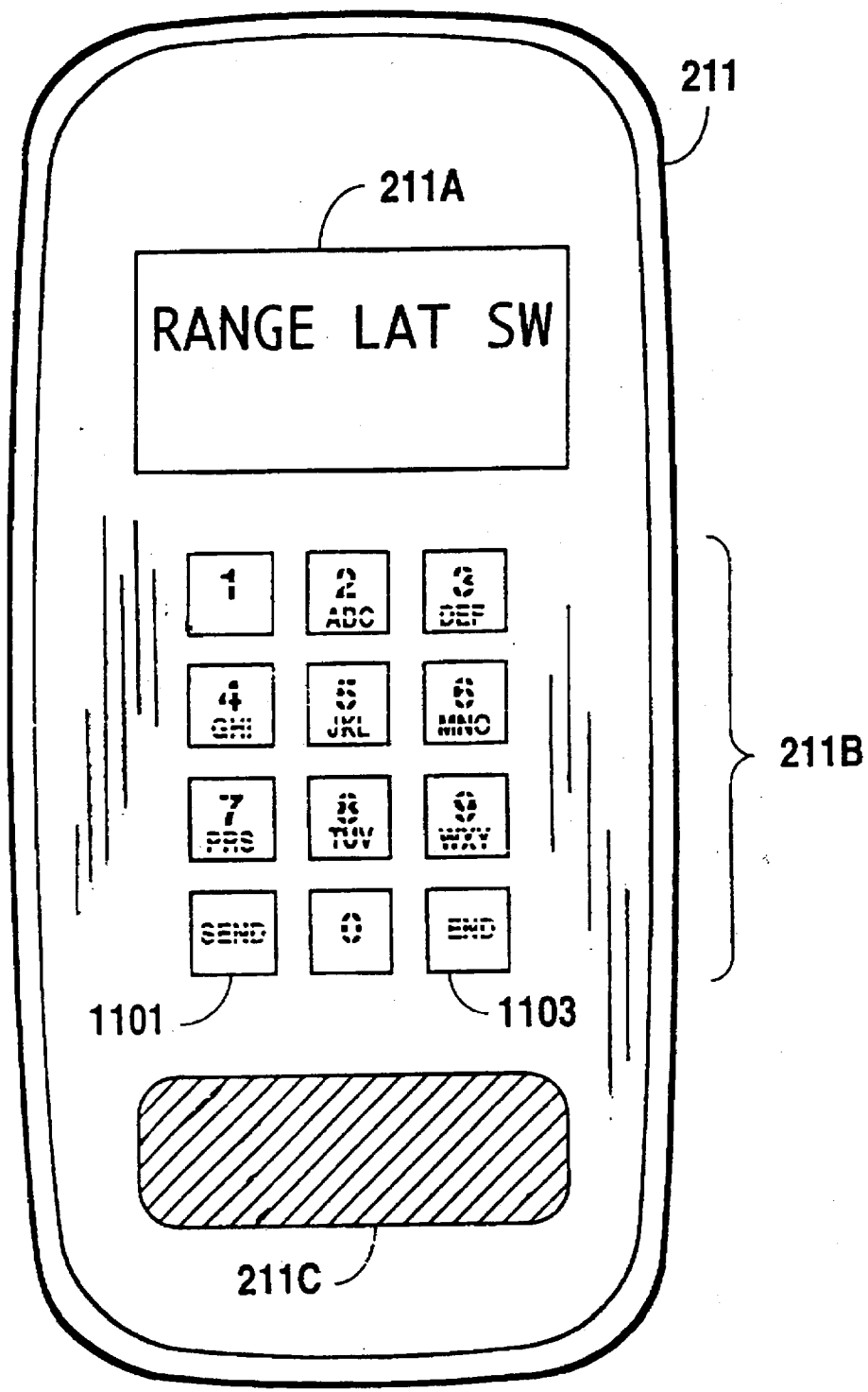

FIG. 11(c) shows the handset 211 in the menu for setting the permitted range for the vehicle 200. The display message of "RANGE LAT SW" indicates to the user to enter the latitude of the southwest corner of a range rectangle. Upon seeing this prompt text, the user is expected to enter, using the keys of keypad 211b, a number corresponding to the GPS position latitude of the southwest corner of the permitted range. The following menu item would be the longitude of the southwest corner; followed by menu items for the latitude and longitude of the northeast corner of the permitted range.

The portable computer 249 is programmed with mapping software. The mapping software resident on the portable computer 249 is operable to poll the communications and control unit 201 for the current position data. The portable computer 249 provides the operator of the vehicle with a display showing a map such as the maps shown in FIGS. 8(a) through 8(i). The user of the portable computer may request the software resident thereon to display routes between the current location and a desired location. To direct the software resident on the portable computer 249 to compute a route to a desired location the user positions a cursor on the desired location on the map displayed or enters the address using the keyboard of the portable computer.

The security system 300 may be placed in a "GPS mode" by entering the command "GPS" on the handset keypad 211. In GPS mode, the CPU 401 displays information stored by the STOREGPS procedure (discussed above in conjunction with FIGS. 10(c) and 10(h)) on the handset display 211a.

In an alternative embodiment, the security system 300 is equipped with a PCMCIA connector linked to the communications and control unit 201. The PCMCIA connector may preferably be located on the dashboard of the vehicle 200. The PCMCIA connector is a standard universal connector for receiving add-on cards to a computer or computerized unit. In the security system 300 an electronic map card, containing map information, may be inserted into the PCMCIA connector. The map information contained on the electronic map card, contains correlations between GPS positions and street names.

In a vehicle 200 located in the area covered by a particular electronic map card, entering the security system 300 into GPS mode causes the display of the street name and street address near the location of the vehicle 200 onto the handset display 211a.

The communications and control unit 201 is further operable to control devices located in other vehicles or in stationary objects such as in a home. Taking the example of controlling devices in a home as an example, a communications and control unit 201 is located in a persons home. The relay drivers 513a and 513b are then connected to relays for controlling appliances in the home, e.g., lights, garage doors, gates, air conditioning, heating and kitchen appliances. The cellular telephone transceiver unit is replaced by a telephone network connection.

An occupant of a vehicle 200 can use the handset 211 to send a control command to the central monitoring station 103. A command available is to "transfer call" to a specified telephone number, which in this case is the occupant's home. The control and communications unit in the occupant's home answers the transferred call. By way of password codes, the authorization to communicate with the occupant's home is verified.

The occupant of the vehicle 200 can then send commands to the control and communications unit in the occupant's home from the handset 211 in the occupant's vehicle.

The present invention has been described in connection with certain preferred embodiments. These preferred embodiments are exemplary of certain modes of practicing the invention. A person skilled in the art will realize many alternatives to specific examples of equipment described herein. For example, where certain functionality is described as implemented in software, a person skilled in the art will realize that the same functionality may be implemented in hardware and in firmware; where a serial communication interface is used, a parallel data interface may be used; where a graphics user interface is used, a line oriented interface may also be used; where a relational database is used, a network or hierarchical database may also be used; where a central processing unit of a particular manufacture is used, any other central processing unit may be used; and a particular type of intrusion detection device is used, any other intrusion detection device may be used. Therefore, while the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

Claimed is:

1. A security system for protecting a vehicle from theft comprising:

a central monitoring station;

a position determination device on said vehicle for determining position data representing the geographical position of said vehicle in response to received radio frequency signals;

a calling unit on said vehicle operable to establish a communication link to said central monitoring station;

a computerized control and communications unit on said vehicle connected to said calling unit and said position determination device for storing said position data, for detecting motion of said vehicle in response to changes in said position data, and for storing selectively entered zone data defining an allowable zone of locations for said vehicle;

wherein said selectively entered zone data includes stored information defining a predetermined period of time for which said zone data is valid; and wherein said computerized control and communications unit is responsive to said detection of motion of said vehicle to activate said calling unit to establish said communication link with said central monitoring station upon detection of movement of said vehicle outside of said allowable zone of locations during said predetermined period of time.

2. A security system as recited in claim 1 further comprising:

an occupant identification device on said vehicle connected to said computerized control and communications unit operable to determine the identity of an occupant of said vehicle.

* * * * *